United States Patent [19]

Vidalin et al.

[11] 4,053,871

[45] Oct. 11, 1977

[54] METHOD AND SYSTEM FOR THE ITERATIVE AND SIMULTANEOUS COMPARISON OF DATA WITH A GROUP OF REFERENCE DATA ITEMS

[75] Inventors: Jacques M. Vidalin, Bordeaux; Jean F. Suchard; Hong H. Quang, both of Paris, all of France

[73] Assignee: Agence Nationale de Valorisation de la Recherche (ANVAR), Neuilly sur Seine, France

[21] Appl. No.: 637,659

[22] Filed: Dec. 4, 1975

[30] Foreign Application Priority Data

Dec. 4, 1974 France .................................. 74.39592

[51] Int. Cl.² .......................... G06F 7/20; G11C 15/00
[52] U.S. Cl. .................................... 340/146.2; 364/900
[58] Field of Search .......... 340/146.2, 172.5, 173 AM

[56] References Cited

U.S. PATENT DOCUMENTS

| | | | |
|---|---|---|---|
| 3,376,555 | 4/1968 | Crane et al. | 340/172.5 |
| 3,402,394 | 9/1968 | Koerner et al. | 340/172.5 |
| 3,588,845 | 6/1971 | Ling | 340/173 AM |
| 3,771,139 | 11/1973 | Digby | 340/172.5 |

*Primary Examiner*—Jerry Smith
*Attorney, Agent, or Firm*—William R. Woodward

[57] ABSTRACT

In a method and system for the iterative and simultaneous comparison of a flow of data with a group of reference data items, the reference data items are recorded in the form of logical entities in a two dimensional memory table, one entity per column, each line containing data elements of the same order of each reference entity. The elements of the flow of data are compared in parallel and successively with those contained in the lines of the table, according to a first function provided by a logic unit. Each time, the results of a comparison are combined with the results already obtained (or, in the case of the first comparison results, with a set of initial register states, typically a "transparent" all-true set of states to pass on the first results to the next combination step which is usually the first meaningful combination step) according to a second function provided by a second logic unit, the result of the method being, in the simplest case, given by the final comparison. The invention is of particular advantage in automatic documentation.

30 Claims, 22 Drawing Figures

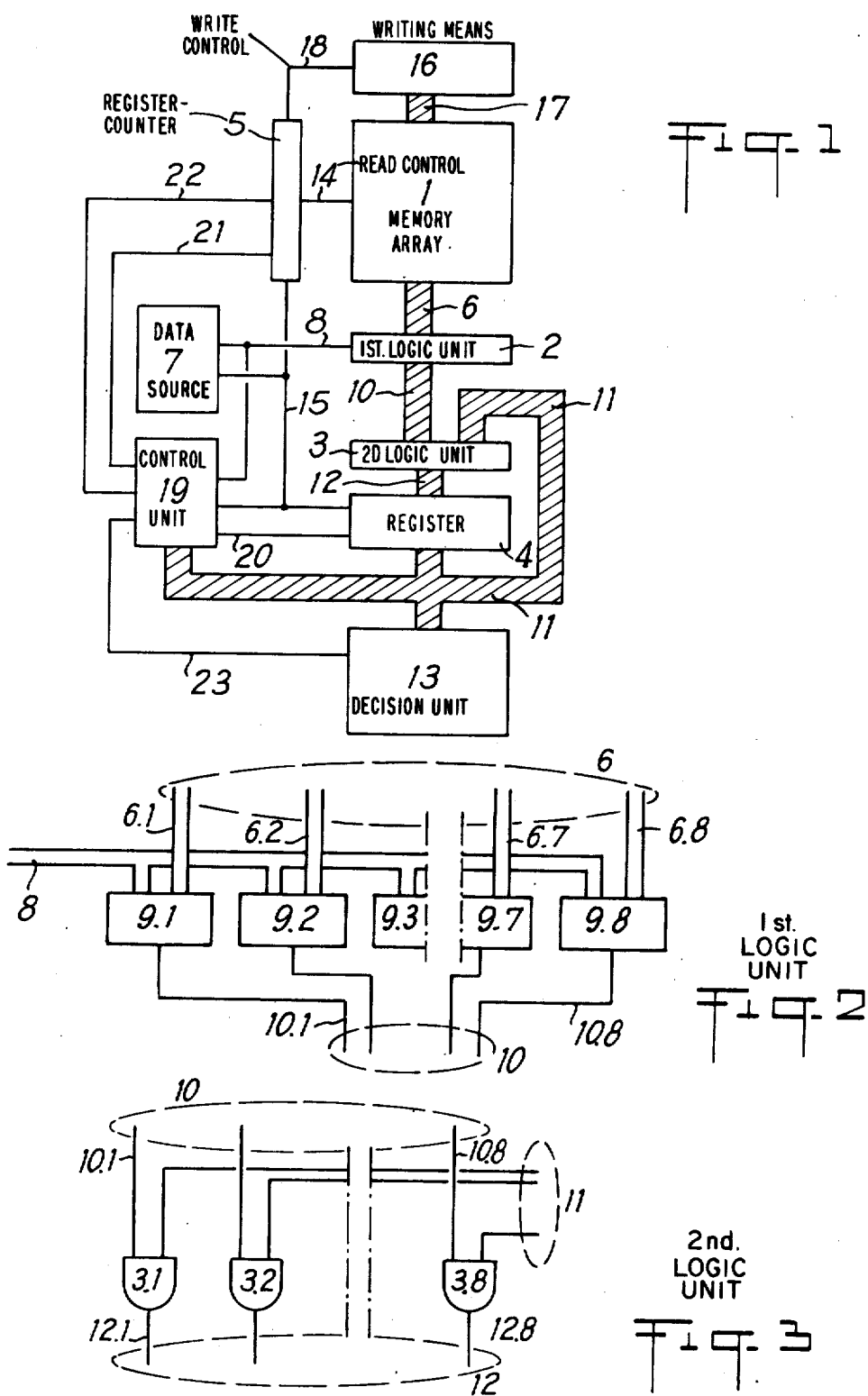

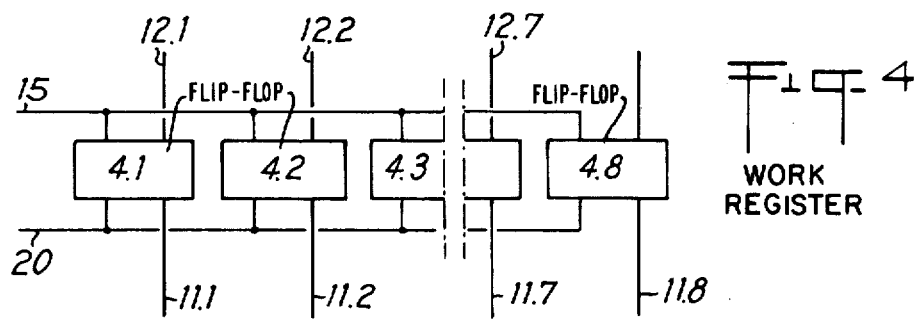
Fig. 4 WORK REGISTER
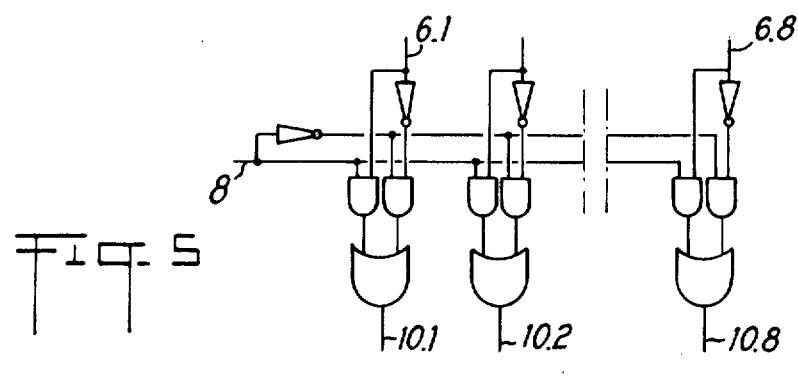
Fig. 5
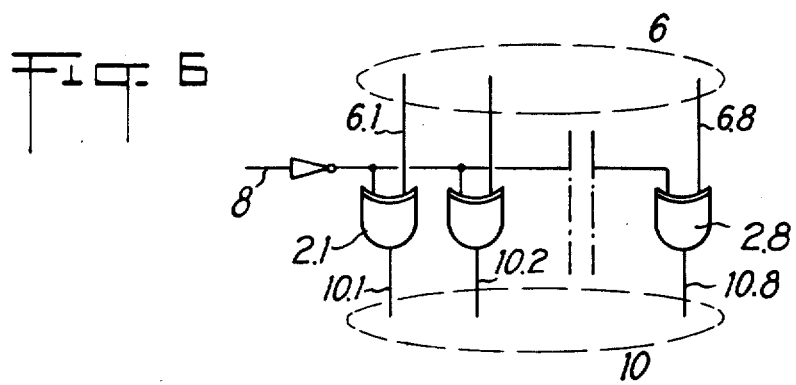
Fig. 6

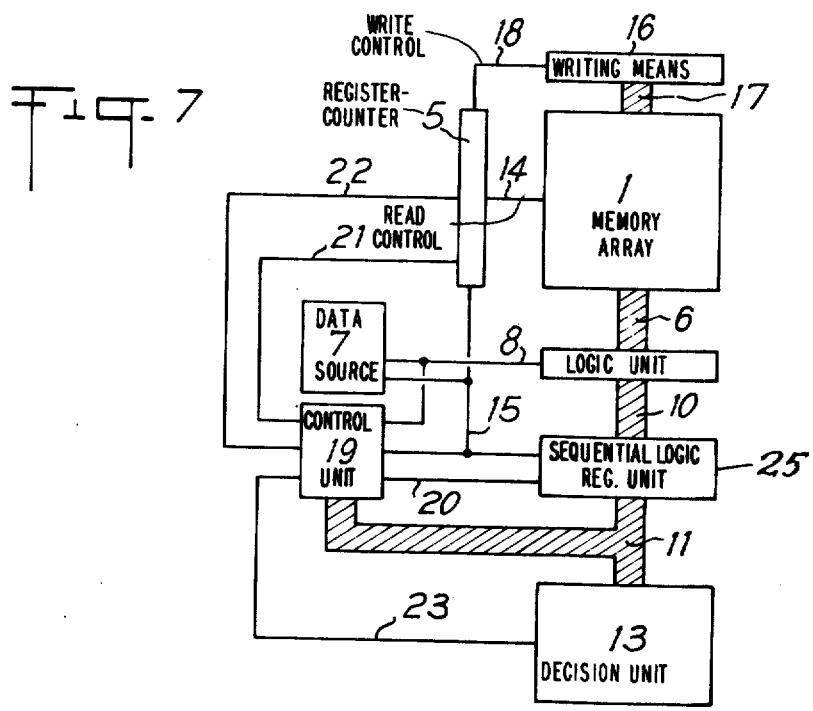
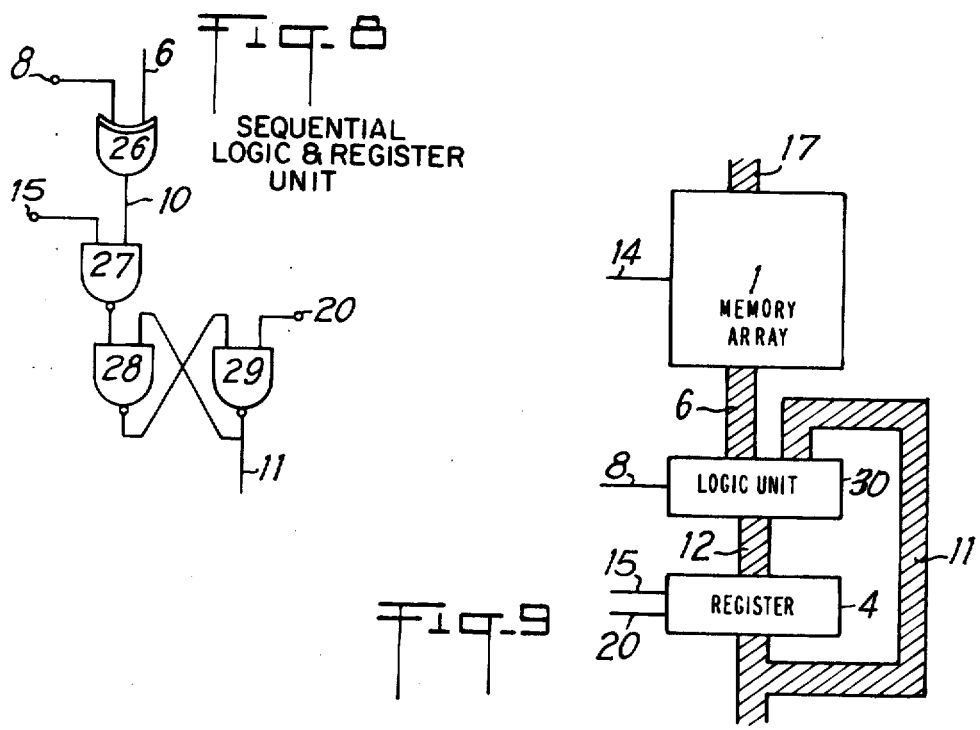

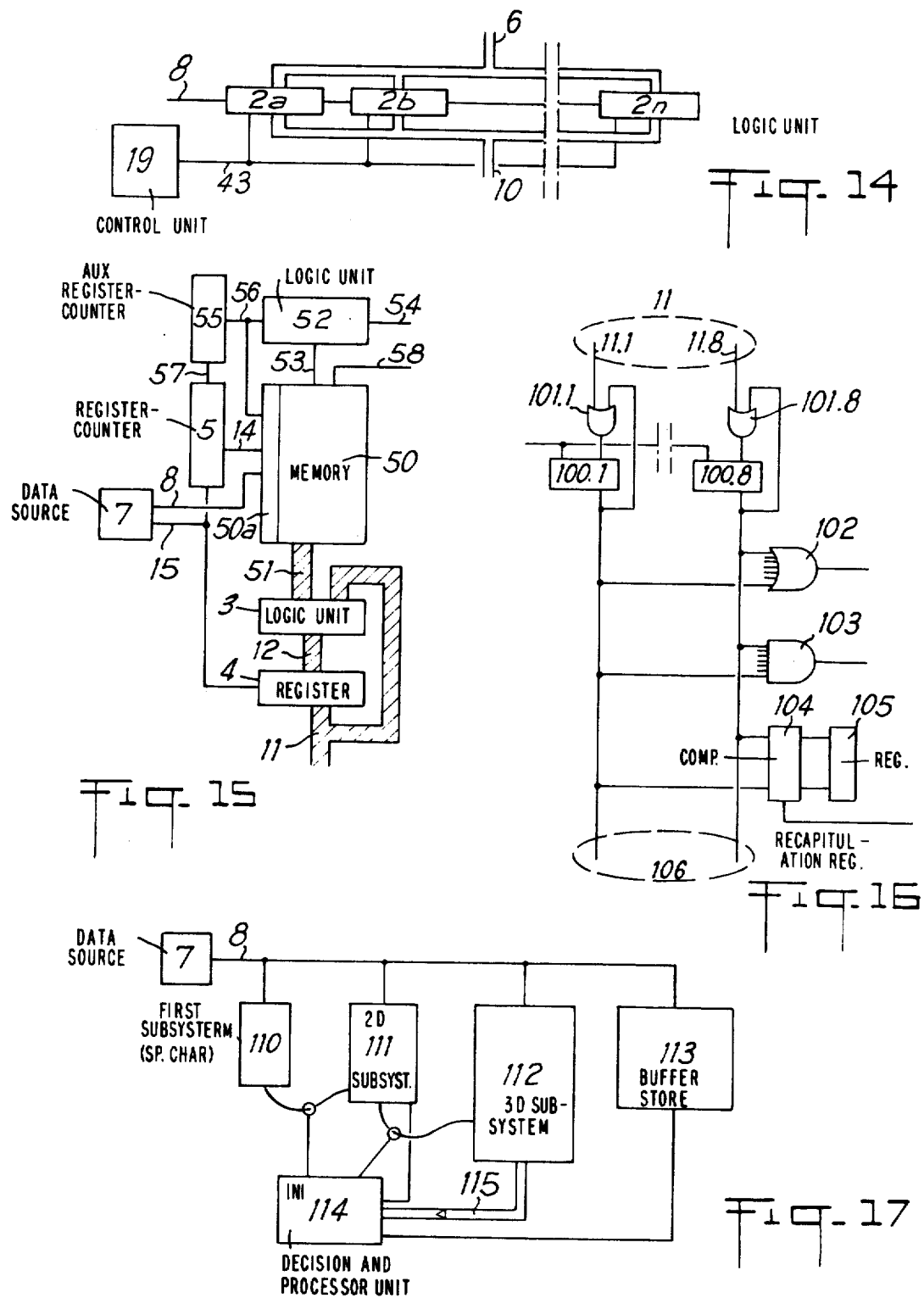

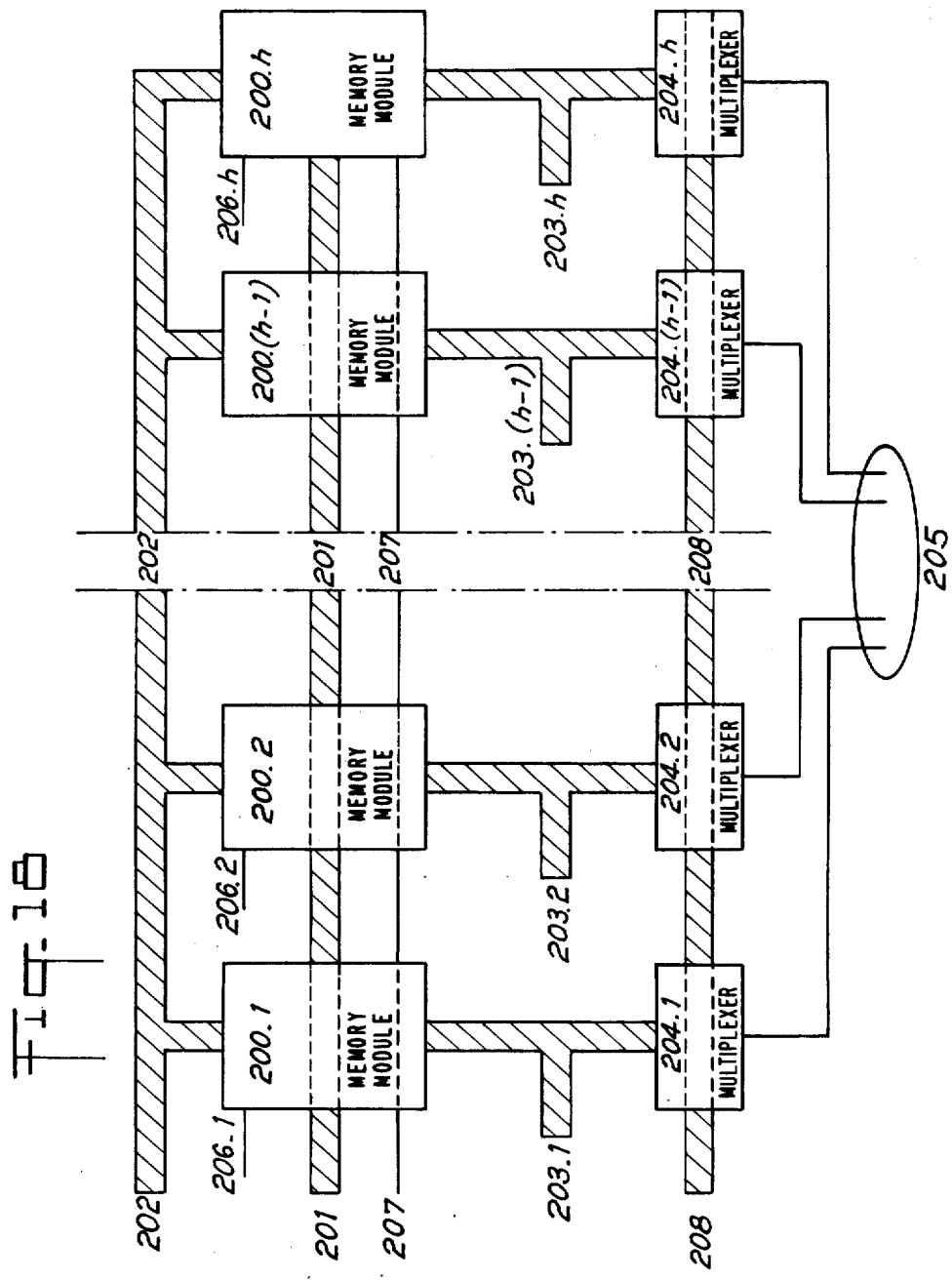

METHOD AND SYSTEM FOR THE ITERATIVE AND SIMULTANEOUS COMPARISON OF DATA WITH A GROUP OF REFERENCE DATA ITEMS

The present invention relates generally to the problem of selecting, by comparison, items of data from a stream of information coming from a data base, as a function of a group of data references.

By "data base" we mean any source of items of data capable of supplying these data items sequentially. For example, it includes: memory files or groups of memory files, whatever may be their technological support; or any means of data transmission; or systems of acquiring data by measurement of parameters; or a processing unit; etc...

The "reference data", which can be of a logical, numeric or alpha-numeric type, are represented in a form compatible with the form of the data coming from the data base.

By "comparison" or, we mean the operation of recognition, through some kind of co-evaluation, of a relationship (i.e. a significant similarity or a limited or a measurable difference between a given item of data coming from the data base and the reference data. This relationship can be of any form whatever, such as: identity, inclusion, greater than, greater than or equal to, smaller than, smaller than or equal to, evaluation of a distance on the basis of a suitable measurement, etc. In other words, the meaning of "comparison" as referred to herein extends to the full scope of the meaning of the French word "rapprochement" as used in France in the domain of data file processing. This general problem of comparison is encountered for example in the domain of automatic documentation, that of the syntactic anaylsis of algorithmic languages and control languages, in the treatment of headings and procedure codes in data transmission, in pattern recognition, in the control of processes, particularly industrial processes, etc.

In a first type of known process, this comparison is effected by a succession of elementary comparisons and/or operations organised on the basis of a tree system. The general principle of this known process will be recalled herein for a better understanding with the aid of the following particular example: in this example, a word delivered by a data base in the form of a memory file is to be compared with different words stored in the data reference, and defining the question which is put to the said memory file.

For example, assume that the word "MEDICAMENT" is to be compared with the group of words: "RESPONSABILITE CIVILE (DES) MEDECINS (DES) HOPITAUX PUBLICS", i.e., "Civil Responsibility (of) Doctors (of) Public Hospitals", the words in brackets being disregarded.

The following elementary comparisons will then be effected in succession:

| COMPARISON | ANSWER |
|---|---|
| M and R | no |
| M and C | no |
| M and M | yes |
| E and E | yes |
| D and D | yes |
| I and E | no |
| M and H | no |
| M and P | no | and so on for the subsequent words provided by the memory file.

It will thus be seen that the number of elementary comparisons which must be effected for exploiting the memory file is at least equal to the product of the number of words obtained in the memory file and the number of words comprised in the question.

Thus one question may easily require eight words. In juridical documentation, it may rise to twenty (this is the experience of the Italian Court of Cassation). One is thus led, once a memory file becomes large, to dividing it into elements which are more rapidly usable, which is sometimes not without raising considerable problems of addressing and reference.

But above all in such a system of comparison, the processing time itself remains problematical. This results from the form of the word which is provided by the memory file, in relation to the form and even the place of the words which are brought into question; thus:

the processing time is a function of the form of the words:

For example, for the word "MEDICAMENT", compared with "RESPONSABILITE CIVILE MEDECINS HOPITAUX PUBLICS" (Responsibility Civil Doctors Public Hospitals), as has been seen there are eight elementary comparisons.

For the word "VETERINAIRE" ("Veterinary"), still compared with the same group of words, one has:

| COMPARISON | ANSWER |
|---|---|
| V and R | No |
| V and C | No |
| V and M | No |
| V and H | No |
| V and P | No | i.e., five elementary comparisons.

The processing time is also a function of the location of the words in the question, since as soon as a word is recognised, one passes to the following word in the memory file.

For the word "CIVILE" ("Civil") compared with the same group of words, one has:

| COMPARISON | ANSWER |
|---|---|
| C and R | No |
| C and C | Yes |
| I and I | Yes |
| V and V | yes |
| I and I | Yes |
| L and L | Yes |
| E and E | Yes | i.e., seven elementary comparisons.

For the word "PUBLICS" ("Public") still compared with the same group of words, one has:

| COMPARISON | ANSWER |
|---|---|
| P and R | No |
| P and C | No |
| P and M | No |
| P and H | No |
| P and P | Yes |
| U and U | Yes |
| B and B | Yes |
| L and L | Yes |
| I and I | Yes |
| C and C | Yes |
| S and S | Yes | i.e., eleven elementary comparisons.

However, it is precisely because the processing time, not only for each word but also for each character or octet, remains indefinite, that in automatic documentation one cannot control the treatment of a memory file at the rhythm at which the data is commonly provided by the supporting means, and particularly by discs or bulk memories. The most evident consequences of this are the awkwardness of the input-output procedures and an excessive bulk of data in the central store in relation to the speed of processing.

Apart from the procedure in the above described example, there exist other procedures of the same type which have the same characteristics.

To overcome these disadvantages of the known processes, it has been proposed to use devices known as "associative memories" or "content-searched memories". The general principle of use of these devices consists in effecting, simultaneously and in parallel, the comparison of one element of information with the contents of all the cells of such a memory, the result being either the number, or the contents of the cells for which the comparison gives a positive response. This necessarily implies wired logic to effect the group of all the numerous comparisons, integrated in the memory structure itself, and is bulky, complex, expensive and completely inflexible as one can modify neither the format of the processed data nor the nature of the comparisons effected.

In practice, these memories have been little used outside very specific applications. In fact, if it is desired to process large volumes of data, voluminous and therefore expensive materials have to be provided. To reduce this volume of material, there have sometimes been used compromise solutions which combine these memories with tree-like searching procedures of the above-mentioned type, but this restores the disadvantages of these latter procedures.

The present invention has for its aim to resolve the general problem exposed above while eliminating the disadvantages of the above-mentioned earlier processes and particularly the necessity for temporarily storing a large part of the data coming from the data base in a random-access memory or an associative-access memory for carrying out the comparison operations.

To this end, the invention is based on the processing principle consisting in effecting in a sequential manner and directly, without intermediate storage, the overall comparison of each of the data elements coming from the data base in parallel with the corresponding data elements of the respective reference data entities, these data elements being of any size and being capable of reduction to the data unit or bit.

It will be supposed in the following that the reference data can be considered as formed of a certain number of independent entities, which will be called reference "logical entities".

These logical entities can be of fixed size, that is to say composed of a fixed number of elements or of data units, as is the case for characters, words or codes formed of a fixed number of characters.

They can alternatively be of variable size. In general, they can then be considered as formed of a variable number of characters, themselves of fixed size, this number being less than a certain limit. They are then separated from one another by a special character, called blank or space for the alpha-numeric data which have this structure, this special character being treated as the last character of the preceding logical entity.

It will also be supposed that at least one part of the data coming from the data base has a structure compatible with that of the reference data, that is to say can be considered as formed of "logical entities" of the same type as the reference logical entities.

Other characters, also known as "special characters" will be used to define the ends of logical entities, or sequences, and if necessary to characterise them.

More precisely, the invention relates generally to a process of iterative and simultaneous comparison of a succession of logical entities with a group of reference logical entities, the term "comparison" being understood broadly as defined above, characterised in that:

a. the reference logical entities are recorded in a two-dimensional table with one entity per column, each line containing data elements of the same order for each reference logical entity, the reference logical entities for which the number of elements is less than the number of lines (or "rows") of the table being terminated by at least one space character or one blank character (the concepts of columns and lines being of course interchangeable), b. data constituting the logical entities to be recognised are received directly from the data source in sequential form in elements of any size, possibly reduced to the smallest data unit or bit, c. the first data element of the logical entity to be compared is compared simultaneously in parallel, according to a first selected function, with all the data elements contained in the first line of the table, and the results of these comparisons are stored, d. the second data element of the logical entity to be compared, is compared simultaneously and in parallel according to the same first function with all the data elements contained in the second line of the table, and the results of these second comparisons are combined in parallel, according to a second selected function, with those earlier stored from the first comparisons, and the results of this combination are stored, e. and in an iterative manner the simultaneous and parallel comparison of the data elements of the logical entity to be compared, with the data elements contained in the successive lines of the table is effected according to the first function, each time combining according to the second function the results of these comparisons with the results of the preceding combination, these operations being continued until the end of the logical entity to be compared is detected or until one reaches the last line of the table, the results of the final combination constituting the result of the comparison for the logical entity considered.

In order for the procedure to be iterative down to the handling of the first comparison results, so as to be able to use the same apparatus configuration for processing the results of all comparisons, including the first, before the second part of step d) above the results of the first comparison are put through a combination with a predetermined initial or dummy set of data elements designed to make the combination "transparent", that is, to pass on as the "combination" result simply the result of the first comparison, for combination with the results of the second comparison.

For greater clarity, there will be described in the following the application of this very general process to the particular example already given above.

Concerning phase (a) of the process, the reference data mentioned above: "RESPONSABILITE CIVILE (DES) MEDECINS (DES) HOPITAUX PUBLICS" ("Civil Responsability (of) Doctors (of) Public Hospitals") will be considered as formed of five logical entities of variable size, ignoring the words between brackets. The reference table will then be, for the case in which the selected data element is the character:

```
R C M H P
E I E O U
S V D P B
P I E I L
O L C T I
N E I A C
S ⊔ N U S
A - S X ⊔
B - ⊔ ⊔ -
I - - - -
L - - - -
I - - - -
─────────
T - - - -
E - - - -
⊔ - - - -
```

In this table the sign "⊔" represents the characters separating the logical entitites and the sign "-" is any character.

This table can alternatively be cut short in the manner indicated by the horizontal line between the twelfth and the thirteenth lines, if it is decided that the reference logical entities should be limited to twelve characters.

If it is decided to take the bit as the data element, and the characters are coded on an eight-bit basis in ASCII with even parity, the beginning of the table would then have the following form:

```
0 1 1 0 0
1 1 0 0 0
0 0 1 0 0
0 0 1 1 0
1 0 0 0 1
0 0 0 0 0
1 1 1 1 1
1 1 0 0 0
1 1 1 1 1
0 0 0 1 0
1 0 1 1 1
0 1 0 1 0
0 0 0 0 1
0 0 0 0 0
1 1 1 1 1
1 1 1 1 0
   etc...
```

The table then comprises 96 or 120 lines, according to whether the logical entities are limited to 12 characters or have 15 characters.

Tables having the same number of columns and a different number of lines will correspond to other information elements.

Turning now to phase (c) of the process, this being carried out with a first logic function for the comparison operation, of the simple "identical-different" form, in terms of characters, the first character of the logical entity received is compared with the characters contained in the first line of the table, i.e.,:

$$\boxed{R\ C\ M\ H\ P}$$

and the result is noted; the result may be False for all cases or may comprise a True result, if the received character is one of the five different characters contained in this line.

In the case in which the same comparison is effected bit by bit, the first line of the table is:

$$\boxed{0\ 1\ 1\ 0\ 0}$$

and the result of this first comparison will be identical with this line 0 1 1 0 0 or equal to its complement 1 0 0 1 1, according to whether the first bit of the entity to be compared is a 1 or a 0. In fact, one of the following comparison operations is then carried out:

```
  0 1 1 0 0              0 1 1 0 0
  1 1 1 1 1      or      0 0 0 0 0
  ─────────              ─────────
  0 1 1 0 0              1 0 0 1 1
``` the 1 corresponding to TRUE and the O to FALSE.

Concerning phase (d) of the process, the second comparison is effected with the second line of the table $$\boxed{E\ I\ E\ O\ U}$$

and this comparison can give no TRUE results, one TRUE result or two TRUE results, since this line contains two identical characters.

The second logic function, for the combination operation, will here be a logical "AND" operation which can only give a TRUE result if the first two characters received form one of the two-letter combinations: RE, CI, ME, HO or PU.

In the case of bit-by-bit treatment, the result of the second comparison is 1 1 0 0 0 or its complement 0 0 1 1 1, and the combination with "AND" logic gives, according to the first two bits of the logical entity to be compared:

| First bit | Second bit | Partial result for the first two bits |
|---|---|---|
| 0 | 0 | 0 0 0 1 1 |
| 1 | 0 | 0 0 1 0 0 |
| 0 | 1 | 1 0 0 0 0 |
| 1 | 1 | 0 1 0 0 0 |

For phase (e) of the process, for character-by-character treatment, the continuation of the operation to row n will only give a result which is not completely false if the series of n characters received is identical with that contained in one of the columns of the table, cut short at row n. If the operation is continued up to the last "space" character of the received entity or up to the last line of a complete table, the result of the comparison is not wholly false only if the logical entity received is identical with one of the logical reference entities.

The final result is the same for a bit-by-bit operation, at the cost of a number of iterations which is eight times greater but which involve simpler operations.

The process uses two different functions which will be appropriately selected according to the result which is required and which also depend on the size of the data elements which have to be manipulated.

In the most simple case, where the operation is carried out bit by bit, the first function will most often, as in the above-described example, be a simple Boolean IDENTITY function, applied between the incident element and the elements contained in the line of the same order in the table, thus giving a result which can be written:

$$R = x \bullet X$$

x being the incident element and X representing the Boolean vector line of the table.

This function can be used for all comparisons of the equal-different type, relating to entities of fixed or variable size.

Other logic or arithmetic functions can be used to effect more complex comparisons, of the "greater than", "greater than or equal", or "arithmetical deviation" type.

The second logic function completes the definition of the comparison which is obtained. It is always a parallel operation, effected between two groups of data elements comprising the same number of elements, element by element and without lateral propagation of carries. As in the case of the first function, numerous logic or arithmetic operations can be carried out but the function which will be most used will be the logic function AND, as in the above-described example, which permits verification that the condition expressed by the first function is fulfilled by all the data elements of the logical entity examined. In particular, the association of this second function with the first IDENTITY function gives an "equal-different" comparison for any number of reference logical entities of any size.

In general, one can thus write: $S := S \cap R$, where R is the result of the first function. The last value of S gives the result of the comparison.

This supposes that the vector S has been initially set at all TRUE and that the logical entities of variable size are terminated by the separation character, including those within the table.

A comparison in terms of the Hamming distance can be made with the aid of the first function "EXCLUSIVE OR" and a second function of the counting type. In effect, it is a question of counting for each reference logical entity the number of different bits. The counting does not have to be extended to a high order but it should not be effected in modulo mode, in order to avoid any ambiguity. A group of non-cyclic four-state counters generally gives a satisfactory result, correct reception of a reference logical entity being indicated by a state (O), the same reception with a single or double error being indicated by a state (1) or (2) and a logical entity which is not recognised or which is received with a larger number of errors being indicated by a state (3).

To obtain a comparison, according to the process one can use various associations of a first and a second function, or a single operation equivalent to these two functions that does not involve producing an intermediate result.

The process according to the invention can also be applied to the treatment of a sequence of logical entities of any size, and this sequence can be of fixed or variable length. In this case, the process of comparison is characterised in that it is applied successively and independently to each of the logical entities of the sequence.

According to another feature, the results of the successive comparisons effected on the logical entities of a sequence are stored with a view to later exploitation.

This storage can be applied to all of the result or can be limited to those which in the aggregate are non-nul and thus correspond to the recognition of at least one of the reference entities.

According to another feature, the results of the successive comparisons effected on the logical entities of a sequence can be combined together according to a third function selected in such a manner that the result of this last combination represents the result of the comparison required for the said sequence.

The third function can be of the same type as the second. An OR function allows, for example, the regrouping of all the positive results of the comparisons effected for a sequence and thus the definition of the recognised entities independently of their order.

The third function can also be of a different type, such as a counting of the non-null vector results, which allows determination of the number of reference entities recognised with repetition in a sequence, or again such as verification of a particular order of occurrence of reference logical entities in a sequence.

According to another feature, the results of the comparisons of the logical entities of a sequence can be successively compared with a group of typical of results of comparisons, with the aid of a second application, simultaneously or otherwise, of the comparison process described above.

Thus, one can effect complex tests, such as framing tests, tests searching the order of occurrence of the logical entities in a sequence, or tests of recognition of a situation such as for example in industrial control or in medical diagnosis.

According to another feature, the comparisons successively applied to the logical entities of a sequence can be applied by using tables and/or different functions, according to the order of the logical entity.

One can thus apply the process directly to a sequence comprising a succession of logical entities of different types or significations. In particular, this is the case for sequences comprising one or more identification characters followed by logical or numerical data, such as is met in data transmission processes, programming and control languages, and in industrial control.

Of course, the process can be applied to a succession of sequences, in accordance with the different possibilities just mentioned for the treatment of a single sequence.

According to another feature, the application of the comparison process to a particular sequence is conditioned and defined by the results of the comparisons which have already been effected.

In this arrangement, particularly, any logical entity or sequence of logical entities can be used for defining the sequence or group of sequences such as a record, subrecord, file, sub-file or any subset of the information contained in the data base and can if necessary be used to specify the nature and the parameters of the comparison or comparisons or the transfers to be applied to the logical entities of the said subset. Thus there is obtained a great flexibility in the treatment of complex structures of data, limited only by the complexity of the logical decisions to be effected. This property also has the advantage of considerably facilitating the application of the process to existing memory files or data bases, avoiding their restructuring.

If one has the choice of data structures, it is often preferable and always simpler to use, as means delimiting and specifying, "special characters" exclusively reserved for this use. In fact, according to another feature of the invention, the identification of these characters is effected by a simultaneous and independent application of the comparison process to all the characters constituting the data to be processed, considered as logical entities of fixed size, the result of this application being used to control the different phases of the process.

In particular; these special characters can control:

1. The initialisation for the principal application of the process, by loading of the table or tables with the reference logical entities from a suitable source which can be the data base.

2. The commencement of a comparison operation.

3. The choice of parameters of the comparison (table and function).

4. The end of a comparison operation.

5. The definition of the data transferred to another unit of the system in the course of or at the end of the comparison operation; this last control function is the most complex because the data to be transferred can be of very diverse nature and origin. In fact, it can concern: the results of the comparison of each logical entity of a sequence; a combination of greater or lesser complexity of comparison results; a part of the contents of the table or tables, or an additional table associated with the table containing the reference data; or one or more sequences of logical entities coming from the data base. In this last case, the definition of the data transferred can necessitate using several special characters, each defining one element of the specification: a sequence subjected to the comparison with conditional transfer, a condition to be fulfilled in order for the transfer to be effectively executed, a sequence subjected to a comparison with storing of results, a sequence or group of sequences not subjected to comparison but for which the transfer is conditioned by one or more results of comparison, and parameters of various comparisons and of decision. It is thus possible to find, in particular, most of the results obtained or proposed with the different types of associative memories previously known, with the limitations of a partially serial organisation, but with an economy and a flexibility of application which is much better and a speed which is generally sufficient, perfectly adapted to the output of data base facilities capable of providing in a continuous manner a large flow of data.

6. The temporary stopping of the search by comparison recognition of special characters; this arrangement is important in all cases where it is impossible to confine use of special characters to use as delimiters, particularly when the data base contains successive zones of different structures, for example a word structure for the logical or numerical data inside an alpha-numeric memory file. The stopping can be applied: for a predetermined extent, up to the end of the physical recording; or more generally, limited by any delimiter independently of the data items themselves. In the absence of a suitable device, one can use one of the known transparency processes of data transmission procedures, but this generally leads to solutions which are cumbersome or less certain.

The process, as described above, is applicable to the processing of all the memory files that are encountered in automatic documentation.

Thus, assume a memory file to be as follows: it is necessarily composed of a certain number of records or sets of sequences; of sub-records or sequences; of key words or logical entities. These sets of sequences, these sequences and these logical entities may be of fixed length or, more generally, of variable length and are thus defined by their headings or delimiters or, for the logical entities, by the blank or space characters which precede them, in the absence of another special character.

In this particular application, these headings or delimiters are special logical entities. Reference special logical entities correspond to them on a table; and the result of the successive comparisons effected on this table controls the carrying out of the various functions of the process of comparison. A selector provides for the determination of the function to be carried out according to the special logical entity which has been recognised. The codes, enabling the selection of these different special entities as a function of the operation which it is desired to control by them, are provided by program from the main processing unit.

These special logical entities control one of the following operations.

1. A comparison operation for the logical entities of the sequence defined by the special entity which has been recognised.

2. A storage operation for the logical entities of the sequence defined by the special entity which has been recognised. A special character placed at the end of each sequence can evidently control the end of the storage operation. It is the last character stored but it has no typographic signification. Additionally, it controls the initialisation of the comparison for the logical entity which follows it.

The treatment of the results obtained controls, when it is positive, the transfer to the principal processing unit of the entitles which have been stored for a single sequence set.

For memory files structured for fixed length, the linking of the various operations can be controlled in a purely interative manner.

The code characterising the treatment of the results of each sequence set can comprise the indication of whether one should or should not terminate the utilization of the memory file when the desired result has been obtained. Termination of use of the memory file is then controlled through the intermediary of the principal processing unit.

The main processes to be effected for each sequence set on the results of the comparisons obtained are as follows:

1. An OR function between the different partial results to determine that at least one of the results search for has been obtained.

2. A comparison function between the different results obtained and a group of results which are being searched for. This is required, in particular, when it is desired to determine whether all the reference logical entities have been recognised in a sequence set.

3. A function enabling the determination of whether the order of occurrence of the logical entitles is in accordance with the desired order.

4. A comparison function executed according to the process itself and effected between, on the one hand, the different result-types obtained and, on the other hand, several groups of results of a type characterising the results for which one is seeking. This simultaneous comparison function may or may not be effected on the results obtained according to a selected order of occurrence, as stated above.

By way of example, suppose that the records of a bibliographic memory file are structured in the manner shown below:

| 4 | AUT | ⊔ | HUGO | ⊔ | VICTOR | ⊔ | 2 | TIT | ⊔ | HERNANI | 2 |

| INDEX | ⊔ | FRANCE | ⊔ | THEATRE | ⊔ | ROMANTIC | ⊔ | 2 |

| DATE | ⊔ | 1840 | ⊔ | 2 | EDIT | ⊔ | GARNIER | ⊔ | 2 |

| DATEDI | ⊔ | 19680515 | ⊔ | CLDEC | ⊔ | 03458186 | 2 |

| NUM | ⊔ | 0345 HUG | ⊔ | 2 | 3 | n.s. | n.s. | 4 |

Such a record has headings the meanings of which are as follows:

| AUT | ⊔ | : AUTHOR |
| TIT | ⊔ | : TITLE |
| INDEX | ⊔ | : INDEX |
| DATE | ⊔ | : DATE OF FIRST PUBLICATION |
| EDIT | ⊔ | : EDITOR |
| DATEDI | ⊔ | : DATE OF EDITION |
| CLDEC | ⊔ | : DECIMAL CLASSIFICATION |
| NUM | ⊔ | : LIBRARY NUMBER |
| n.s. | | : NON-SIGNIFICANT OR TYPOGRAPHIC CHARACTER |

Such a record could evidently comprise other headings or other sequences, for example: the name of the person who wrote the preface or the various notes comprised in the edition; the name of the printer or the date of legal deposit, etc.

The sign ⊔ means there is a blank or space character. It controls the initialisation of the comparison for the logical entity which follows it.

The sign ⊔ means that there is a special character without typographic signification and for which the function is to control the end of the storing operation at the same time as the initialisation for the comparison for the logical entity which follows it.

The sign ⊔ means that there is a special character the function of which is to control the processing of the results obtained for the record considered. It is followed by a certain number of characters which control no function and simply permit the processing of the results received to be executed before the first comparison is demanded by the following article. The are necessarily completed by a special character ⊔ which controls the resetting to zero of all the partial results or final results which have been obtained and provides the initialisation for the comparison to be effected on the first special entity of the record which follows.

These different special characters are recorded on the memory file in suitable locations, by programming, when the memory file is formed.

However, it is evident that these functions controlled by special characters can be controlled by special logical entities; and the exact moment when these functions are used must be borne in mind, that is to say at the end of the comparison of these special entities.

Thus, one could have as headings:

ART ⊔ : DEBUT D'ARTICLE (beginning of record) the function of which is to reset to zero all the partial or final results which have been obtained for the sequence set which precedes it.

FART ⊔ : FIN D'ARTICLE (end of record) which controls the processing of the results received. This treatment will take place during the comparison of the special entity ART ⊔ which follows it.

The same applies for the special character ⊔ . It can be replaced by a special entity. The special entity need not have any typographic signification. However, in this example, the initialisation of the comparison can still be controlled by the special character ⊔ .

The memory file having been formed, the user will have the choice of the question which he puts and of the reply which he wishes to obtain.

For example, suppose that he wishes to obtain the TITLE of the THEATRE works of VICTOR HUGO and the NUMBERS under which these works are classified in the library.

Before using the memory file, he records on the table reserved for the special entitles AUT ⊔ , TIT ⊔ , INDEX ⊔ , NUM ⊔ , but in such a manner that the selector, for the comparisons effected on the special entities AUT ⊔ , INDEX ⊔ , can, in the case of a positive result, control a comparison function for the following sequence; and that, in the same way, for the comparisons effected on the special entities TIT ⊔ , NUM ⊔ , it can, in the case of a positive result, control a storage function for the following sequence.

All storage, for the purpose of special processing, can be controlled by special logical entities. This would be utilised, in the example chosen, if the user had wished to have in the response only the additions of the theatrical works of Victor Hugo after a certain date, say 1950. The special entity DATEDI ⊔ is then to be recorded on the table reserved for special entities; and when it has been recognised by comparison, the selector will control a special storage operation which will permit, at the moment of processing of the results, a simple comparison operation to be carried out between this stored information — say 19680515 ⊔ — and the reference information — say 19500000 ⊔ — outside the comparison process described above.

Again before the use of the memory file, the user will fix the nature of the comparison operations which he wishes to have effected by the process described above, in this case a comparison-identity operation. Additionally, he will have recorded, on the table reserved for logical entities, the reference logical entities corresponding to his question, namely in this case: HUGO ⊔, VICTOR ⊔, THEATRE ⊔. The reference information 19500000 ⊔ does not in this example cause a comparison according to the process described above and it is thus not recorded on this table.

For there to be a positive response to the question posed, it is necessary that for a single record, all the three logical entities HUGO ⊔, VICTOR ⊔, THEATRE ⊔, have been recognised. This supposes, if these three entities were recorded in the three first columns of the table of reference logical entities, that one has a result which is wholly identical with the reference vector

1110000000000000 if the table can contain sixteen reference entities. Additionally, the user can choose for the processing of the results obtained for each article, the function which corresponds to this comparison identity.

The invention also concerns special modes of application of the process, more particularly intended for the processing of data items of variable length, such as those encountered as explained above in automatic documentation or in any other domain in which a data base consisting essentially of text in natural language has to be manipulated.

These special modes of application of the process may involve a first process which is characterised in that the recognition of a special character, indicating the beginning of a logical entity or of a sequence of logical entities to be compared, causes the initialisation of the comparisons relating to these logical entities, the use of the results of the comparison previously effected, the carrying out of auxiliary functions, such as those of storage, and in that the identification of a special character or a special logical entity, indicating the nature of the following sequence of logical entities, defines the nature of the comparisons effected, the utilisation of the results obtained by the comparison of this sequence and the nature of the said auxiliary functions.

In fact, in a data base in natural language, or semi-natural language, that is to say composed of words derived from a natural language but used in the framework of a stricter syntax, the logical entities are words separated by blank or space characters. According to the organisation of the data base, certain ones of these spaces are replaced or completed by different special characters serving as indexes for the beginning of the sequences and the zones. To avoid multiplying the number of these special characters, there are used logical entities, known as special logical entities, defining the nature of the sequences and their signification, such as:

AUT ⊔
TIT ⊔
INDEX ⊔ etc ...

The systematic and simultaneous searching for these special logical entities enables suitable comparisons to be made on the sequence of logical entities to be compared, while using a minimum of special characters, which may in some cases be reduced to a single blank or space character.

In this latter case, the special character function is entirely taken over by the special logical entities. This permits the adaptation of the process to data bases of different structures, that is to say normally comprising a variable number of special characters, for example constructed within the framework of the classical processes of management of these data bases.

The invention concerns not only processes, as already discussed, but also, as a second general class of subject matter, means for carrying out the above described processes.

These means form a system enabling the comparison of a logical entity with a group of logical reference entities, characterised in that it comprises:

a. a read-write memory having as many locations as there may be data elements in the reference logical entity of maximum length, each location comprising as many storage elements as there are logical reference entities, this memory being provided for the storage of the above-mentioned table on the basis of one line as the table per location;

b. a register-counter addressing the said memory sequentially location by location in a non-cyclic manner;

c. a first logic unit for effecting the comparisons of the information element of order n of the logical entity to be compared, withe the contents of the storage elements of the memory location of the same order;

d. a second logic unit for effecting the combination of the results of comparison, and provided with a result register for storing its output, receiving at a first input the parallel outputs of the logic unit and at a second input the result of its own previous operation from its result register (or a set of initial states if there was no previous operation), e. and a control member itself controlled by clock signals associated with the signals representing the logical entities to be compared, delivering an advancement signal for the register-counter and a writing signal in the results register.

In another embodiment, the system enabling the comparison of a logical entity with a group of reference logical entities is characterised in that it comprises:

a. a store memory for storing the reference logical entities in a coded form, of which each location contains the result of the comparison of the data elements of the same order of the reference logical entities with a special configuration of the data element coming from the source;

b. an addressing unit comprising a register-counter and a decoder which selects the memory location corresponding to the received combination and to its order;

c. a logic unit similar to the second logic unit of the previously mentioned system embodiment, for effecting the combination of the results of comparison and receiving on one input the output of the memory and on the other input the result of the preceding combination contained in its ouput register;

d. and a control unit, controlled by the clock signals associated with the signals representing the logical entities to be compared, delivering an advancement signal for the register-counter and a writing signal for the register, which may be referred to as the work register.

The invention provides, and concerns, a system of comparison for the special application of the process described above, and this system is characterised in that it essentially comprises:

three comparison sub-systems provided respectively for the identification of the special characters, for the identification of the special logical entities, and for the comparison processing of the logical entities or sequences of logical entities defined by the characters or special logical entities with the reference logical entities;

a logic control device ensuring the linking of the elementary operations and, in particular, the initialisation of the comparison operations;

a buffer store capable of storing one or more sequences with a view to their later use; and a writing means for entering the reference locical entities into the memories of the comparison subsystem.

According to a supplementary feature, this system additionally comprises:

a fourth comparison sub-system for the recognition of a certain number of types of results, among the results provided by the third comparison sub-system; and a second buffer store capable of storing the diagnoses resulting from this recognition.

This structure enables simultaneous function of the three or four comparison sub-systems, with an operational cycle as simple adn rapid as that of a single comparison system.

In addition, the three table memories of the first three sub-systems can be addressed by a common addressing device, in a different way for the first one, however.

All these organs are each of an essentially modular nature, which enables the capacity of each sub-system to be adapted independently to the numbers of characters or logical reference entities, and/or of types of useful result for a given application.

The invention, also concerns a process for performing in case of error, a retry for any part of the flow of data coming from the source, characterised in that all the characteristic data necessary for this retry is retained in duplicate registers connected in crossed fashion with the registers containing this data in such a manner that the checking operations, for example by parity or by cyclic code, effected on each of these parts, causes at the end of each of them, either the copying of the main register into the duplicate register in the case of a correct checking, or the copying of the duplicate register into the main register in case of error.

The invention further concerns a process providing for modification of the contents of one or more recordings subjected to comparison, characterised in that the position of the record or records or sub-records to be modified is indexed during the reading of each recording by one or more pointers retained until the end of the said reading and which will be used to effect the modification or modifications in a buffer store containing the whole of the recording, this latter being then re-written in full on the data base record medium.

Finally, the invention has also for its object a process allowing the storing a priori of sequences or sequence sets of logical entities subjected in whole or part to comparison, and which may be of interest in whole or part to the utilising organ, characterised in that a starting point is retained systematically during the reading of such as sequence or sequence set until the decision, resulting from the group of comparisons effected, acts to control: either the bringing up to date of the said starting point at the end of the sequences stored, with a view to the retention of the stored entities for later transfer, or the return of the adddressing mechanism of the buffer store to the said starting point for the recording of a new sequence or sequence set with the destruction of the undesired previously stored sequence or sequence set.

These characteristics, as well as the invention in its entirety, will be more easily explained with the following description of embodiments of systems according to the invention. This description will refer to the accompanying drawings, in which:

FIG. 1 shows diagrammatically the organisation of a comparison system embodying the invention;

FIG. 2 is a diagram of the first logic unit of the system of FIG. 1

FIG. 3 is a diagram of an embodiment of the second logic unit of that system;

FIG. 4 is a diagram of an embodiment of the work register of the same system;

FIGS. 5 and 6 are examples of circuits useable for the first logic unit;

FIG. 7 shows diagrammatically a modification of the system of FIG. 1;

FIG. 8 is an example of a circuit constituting the logic unit of the FIG. 7 system;

FIG. 9 shows diagrammatically a second modification of the system of FIG. 1;

FIG. 14 represents a modification of systems of preceding figures, by which several types of first logic unit are provided;

FIG. 15 shows a second system embodying the invention;

FIG. 16 shows a form of the utilisation and decision device which the system of FIG. 15 comprises;

FIG. 17 shows a complex comparison system formed by three sub-systems;

FIG. 18 shows the logical organisation of a memory particularly adapted for systems embodying the invention;

Figure 10:
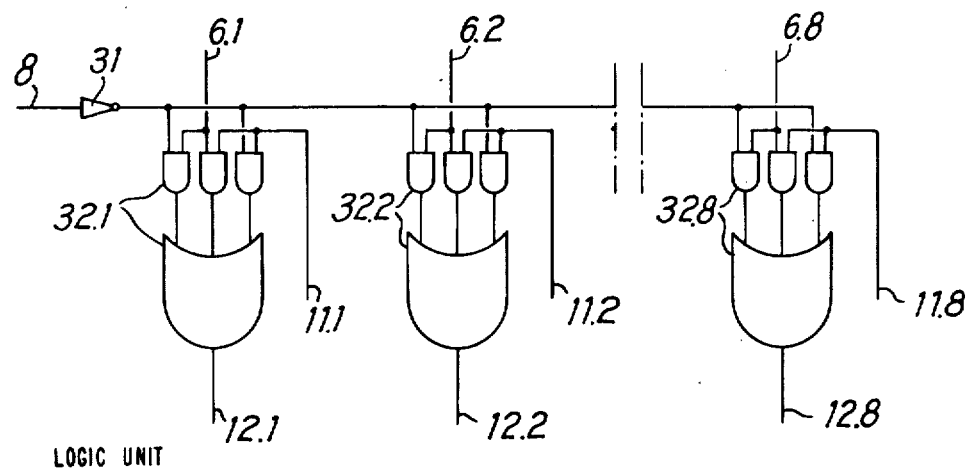
FIG. 10 is an example of a circuit constituting the logic unit of this second modification.

In a first form, shown diagrammatically in FIG. 1, the processing system comprises essentially a read-write memory 1 comprising the reference data, two logic circuit units 2 and 3 providing respectively the first and second functions, as described above, a work register 4 containing the results and a register-counter 5.

The characteristics of all these members depends principally on the structure of the reference data and on the selected method of carrying out the comparison operation.

We will explain this with the aid of the example already used above to illustrate the process.

In this example, the reference data comprises five logical extities of variable size, of the type comprising a chain of alpha-numeric characters. The maximum length of these entities is of fifteen characters, space included. We will assume therefore, allowing a little for use, in the same system of larger sets of reference data that the reference data may comprise a maximum of eight logical entities of sixteen characters.

In the given example, the comparison operations according to the invention have been described as capable of being carried out at two different levels, at character level or at bit level.

In the first case, each location of the memory 1 contains a line of the reference table, that is to say the characters of similar order of the different logical reference entitites. The said memory will thus comprise sixteen locations, of which the capacity will be 48–64 bits according to the code used to represent the characters, and thus in all 768–1,024 bits.

The connection 6 coupling the memory 1 to the first logic unit 2 must have a size, that is to say a number of transmitted signals, equal to the capacity of a location, in this case 48–64 bits. The logic unit 2 also receives data from the source 7 through the connection 8, in series per character in this case. The logic unit 2 thus comprises circuits capable of effecting in parallel the operation which performs the first function, as defined above, on eight characters.

FIG. 2 shows diagrammatically the corresponding structure, composed of eight elementary logic circuits 9.1 to 9.8, receiving simultaneously through the connection 8 the character to be compared and separately through the channels 6.1 to 6.8 the reference coming from the memory 1.

The result of this first operation is transmitted to the second logic unit 3 through the channel 10 formed by the grouping of the output connections of the logic circuits 9.1 to 9.8. Its composition depends on the complexity of this result and as a consequence on the nature of the first function. For a simple operation, of equal/different comparison, inclusive or analogue, the elementary logic circuit 9 will provide only a single output signal and the link 10 will have to transmit only eight signals to the second logic unit 3. For multiple comparison operations, such as those that can be obtained with the TTL integrated circit of type 7485, the number of signals to be transmitted to the logic unit 3 can be two or three times higher.

The logic unit 3 is generally a logic unit effecting the logic operation AND on the results of the comparisons successively effected by the operator unit 2. The logic unit 3 receives these results through the channel 10 and, through the channel 11, the contents of the work register 4. The result of this second operation or combination is transmitted to the register 4 through the channel 12.

FIG. 3 is a diagram corresponding to this case, which can be carried out for example with the aid of two TTL integrated circuits of type 7408, comprising eight AND elements indicated by the references 3.1 to 3.8. Other combinational functions can be effected with the aid of different logical or arithmetic functions, for example OR, inclusion or counting. On the other hand, for more complex comparison operations such as the framing searches or order of occurrence searches, the respective roles of the first logic unit 2, of the second logic unit 3 and of the work register 4 become more difficult to isolate and it may be preferable to use one of the forms of realisation of the inventin described further below with reference to other Figures.

The work register 4 receives, through the channel 12, the result of the combining operation effected by the logic unit 3. Its content is transmited back to this same logic unit and to a utilisation organ 13 through the channel 11. The work register 4 comprises at least eight bistable circuits 4.1 to 4.8, as shown in FIG. 4, and can be constructed for example with the aid of two TTL integrated circuits of type 7475 or of four TTL circuits of type 7474.

The register-counter 5 has the function of sequentially and noncyclically addressing the memory 1 in such a manner that the memory supplies the first logic unit 2, through channel 6, with the contents of its locations. In this first case, we are thus concerned with a counter of sixteen states, composed of four binary bistable circuits, for example formed with a TTL integrated circuit of type 7493. The addresses thus defined are transmitted to the memory 1 through the connection 14.

In the case of bit-by-bit processing, the memory 1 must comprise from 96 to 128 locations according to the code used, each location having a capacity of eight bits. This will also be the size of the channel 6, and the logic unit 2 must comprise eight circuits for carrying out elementary comparisons between the bit arriving from the source through connection 8 and the eight bits derived from the memory through channel 6. Two examples of circuits are shown in FIGS. 5 and 6 for the simple equal/different comparison, the first utilising for example the four-way multiplexer TTL integrated circuits of type 74155 or 9309 and the TTL inverters of type 7404 and the second using two TTL exclusive-OR integrated circuits of type 7486 and an inverter.

The output channel 10 of the logic unit 2 has the same characteristics as in the first case and it is the same for the logic unit 3 and the register 4, at least in the simplest case when the second function is independent of the data element to which the first function is applied. The circuits of FIGS. 3 and 4 can then be used.

The register-counter 5 will be in this case a register having 128 states and comprising six binary bistable circuits.

Given the strictly sequential character of the operations to be performed, the control of these operations can be effected by a simple time reference signal provided by the source 7 through the connnection 15. This signal will control the storage in the register 4 of the provisional result coming from the logic circuit 3 through the channel 12 and the simultaneous advancement of the register-counter 5. If the source 7 does not provide an independent time reference signal, a suitable separator circuit will be used to reconstitute it from the composite signal coming from the source.

The initialisation of the circuit will comprise two distinct operations. The first is the loading of the memory 1 with the reference data. This is effected by a writing unit shown diagrammatically at 16 in FIG. 1, with its data channels 17 and its address control connection 18. The addressing of the memory 1 during the loading depends very much on the particular properties of the memory and on the form in which the reference data is supplied but in general it will be sequential, as during the processing, and can thus be effected by the register-counter 5. The loading operation will be greatly simplified if it is possible to have access to the memory 1 in writing other than location by location, for example character by character in the first mode of operation, or by column in the second. This imposes a particular structure for the said memory which may be incompatible with certain technologies.

The second part of the initialisation consists in setting the work register 4 and the register-counter 5 to the initial state. The initial state of the work register 4 will be preferably that for which the logic unit 3 becomes transparent to the output of the logic unit 2 so that the output of the operator unit 2 is copied into the register 4. When this is not possible or is too difficult to carry out, given for example the absence of a neutral element for the second function chosen to carry out the comparison, account must be taken of the influence of the initial state of the register 4 during the interpretation of the result of the comparison, the final state of this same register, by the utilisation and decision unit 13.

One can also use the initialisation of the work register 4 to limit the application of the comparison to one part of the reference logical entities contained in the memory 1. This is particularly so with the logic unit shown in FIG. 3. An initial state which is 0 or false in one of the bistable circuits of the work register 4 is equivalent to the inhibition of the comparison with the corresponding reference logical entity.

The register-counter 5 will be initialised in the state which addresses the first location of the memory 1. This initialisation should be effected at the beginning of each logical entity received and will be controlled either by counting in the case of entitites of fixed length, or by the detection of special characters in the case of entities of variable length. These tests will be effected by a special control unit represented at 19 in FIG. 1, which receives the data signals and the time signals from source 7 through connections 8 and 15 and supplies, through connections 20 and 21, the initialisation signals for the register 4 and 5. This control unit thus receives from the register-counter 5, through connection 22, an end-of-cycle signal and likewise provides an end-of-operation signal to the utilisation and decision unit 13 through connection 23, in order to cause the sampling of the result which is then contained in work register 4 and its exploitation. As shown in FIG. 1, the output channel 11 can also go to the control unit 19, to permit it to take into account the result of a comparison for the initialisation of the succeeding comparison.

In a modified form, shown in FIG. 7, the functions performed in the first embodiment by the logic unit 3 and by the work register 4 are provided by a single unit 25 identified in the drawing as a register although it has buit-in logic. This latter has then only one data input (the channel 10), one output (the channel 11), and two control connections 15 and 20, all these connections having the same role as in the first embodiment. The said modification often leads to circuits which are cheaper than that of FIG. 1 and it is particularly well adapted for any case in which the second function is an arithmetical operation or a counting operation. This is the type of operation which is generally used in the complex comparison operations, as in Hamming distance evaluations, for example.

FIG. 8 shows an embodiment of this modification for a simple equal/different comparison, in bit-by-bit mode. The circuit shown comprises one stage of the logic unit 2, constituted by an EXCLUSIVE OR circuit 26 and one stage of the logic and register unit 25 constituted by three NAND circuits 27-29. The NAND circuits 28 and 29 form a set-reset bistable circuit, the NAND circuit 27 being connected to the reset input of this bistable circuit.

Upon initialisation, the signal coming from the control operator unit 19 through the connection 20 sets the group of bistable circuits of the logic and register unit 25. Each unit of information coming from the source 7 through the connection 8 is then compared in parallel with those provided by the memory 1 through the channel 6 by means of EXCLUSIVE OR circuits 26. In the case of a disagreement between the signal 8 and one of the signals 6, the output signal of the corresponding circuit 26, transmitted through the channel 10 to the NAND circuit 27, allows the control signal 15 to reset the set-reset bistable circuit. Thus, at the end of the comparison operation, a bistable circuit which remains set indicates that there is no mismatch between the corresponding logical reference entity and the logical entity received from the source, that is to say that they are identical. The contents of the set-reset bistable circuits of the logic and register unit 25, accessible through the channel 11, thus give a criterion for the identification of the logical entity received.

By associating a group of eight circuits of this type with a read-only memory of eight locations of eight bits and one simplified control circuit, there is formed simply a circuit for identifying characters utilisable for the indentification of the special characters and in particular of the character separating the logical entities of variable length. The unit thus defined can therefore serve as a control unit for the logic units of a comparison system intended to process logical entities of variable length, that is to say to constitute the essence of the unit represented at 19 in FIG. 1. The memory described above for this unit is given only by way of example, the number of locations and their size being variable according to the length and the number of the special characters. In the same way, a read-write memory can be employed for the case in which data represented in different codes, or containing different sets of special characters, must be processed.

In a second modification shown in FIG. 9, the functions of the logic units 2 and 3 are fulfilled by a single logic unit 30 receiving data through the channels 6, 8 and 11 and transmitting the result to the register 4 through the channel 12. FIG. 10 shows, by way of example, one form of the logic unit 30 for a binary comparison of the "greater", "lesser", "greater than or equal", or "less than or equal" type. It can be applied to data of any form, for example numerical data, in bit-by-bit processing, the less significant elements first. For the non-numerical data, this can constitute a sorting operation. The logic unit 30 then comprises an inverter 31 and eight triple AND-OR logic elements, 32.1 to 32.8, each of which evaluates sequentially the result of the binary subtraction effected between the logical entity received and one of the reference logical entities. The choice between these four possible tests is defined by the initial content of the work register 4 and by the interpretation of the result, the final content of the same register. This specification can be different for the eight reference logical entities, which permits comparisons of different types to be effected simultaneously and thus enables framing searches or limit searches to be carried out directly.

Figure 11:
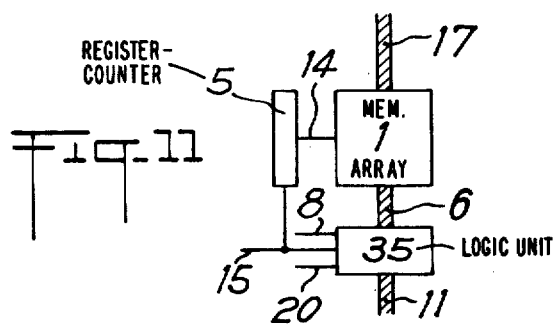
FIG. 11 is a modification combining in a single logic unit the two logic units and the work register of the system of FIG. 1.

In a third modification, shown in FIG. 11, the functions of the two logic units 2 and 3 and of the work register 4 are combined in a single logic unit 35. Of course, numerous other modifications are possible. Thus, all the examples have been described for a group of eight reference logical entities each comprising a maximum of 16 characters of 128 bits.

Figure 12:
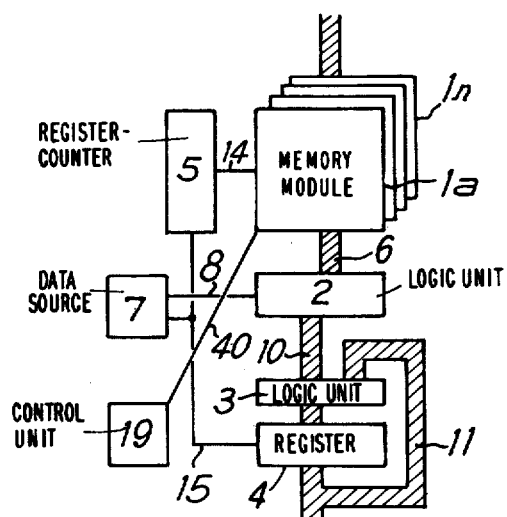
FIG. 12 shows a modification of the system of FIG. 1 comprising a number of memory modules.

In still another variation shown in FIG. 12, the comparison circuit comprises a number of memory modules, such as 1a to 1n containing different groups of reference data. All these modules are addressed in parallel through the register-counter 5 by way of the connection 14. The selection of the module used at any given time is defined by the control unit 19 through the connection 40.

Figure 13:
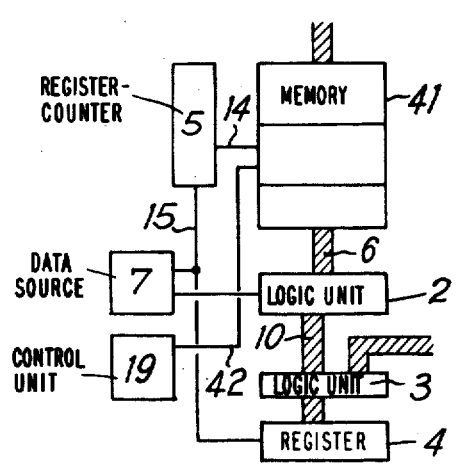
FIG. 13 shows a modification according to which different groups of reference data are respectively contained in different parts of a common memory.

In yet another modification shown in FIG. 13, the different groups of reference data are contained in different parts of a common memory 41. The addressing of this memory is then performed by the combination of the contents of the register-counter 5, through the connection 14, and an address complement provided by the control unit 19 over connection 42.

In still another modification, the logic unit or units 2, 3, 25, 30 or 35 are constituted by a number of different logic units receiving the same data and the operation of which is controlled by the control unit 19.

For example, as shown in FIG. 14, an a logic unit 2 is replaced by a group of independent logic units 2a, 2b . . . 2n, which carry out as many different first functions. These logic units receive their input data in parallel from the memory 1 and from the source 7 through the connections 6 and 8 and their outputs are regrouped in a single output 10. The choice of the logic unit 2 which is effective at any given instant is controlled by the control unit 19 through a connection 43.

According to yet another modification, the logic units 2 and 3 or the combined logic and register units 25 or 30 are formed by means of multi-function logical circuits such as the TTL integrated circuits of type 74181. This arrangement enables a system capable of carrying out comparisons of diverse natures to be constructed in a compact manner.

In a second embodiment shown in FIG. 15, the table of reference data is contained in a memory 50. This memory is addressed by a combination of the output 14 from the register-counter 5 and the data element received from the source 7 over connection 8. This combination selects one location of the memory 50 through the intermediary of the decoding circuit 50a, which location contains the result of the comparison, according to the first function, of the data element received with the data elements of the same order of reference logical entities. The contents of the said location provided by the memory 50 through the channel 51 are combined according to the second function by the logic unit 3 with the contents of the work register 4, available through the channel 11. The result of this combination is recorded in the work register 4 through channel 12 and the control signal provided by the source 7 through the connection 15. The same signal causes the register-counter 5 to advance at the same time, to prepare for the processing of the following data element.

The initialisation of the memory 50 is carried out by means of the logic unit 52 which enables the comparison, according to the first function, of the successive data elements of the reference logical entities presented over connection 54 with the different configurations presented by the auxiliary register-counter 55 on connection 56. The connection 57 enables the register-counter 5 to be advanced by one step at each cycle of the register-counter 55. The addressing of the memory 50 is effected through the connections 14 and 56. Finally, a connection 58 enables a direct loading of the memory 50 to be effected, for example in the case of repetitive operation, with the aid of already prepared data.

This embodiment can comprise the same modifications as those described in connection with the first embodiment, with the exception of those modifications shown in FIGS. 9-11.

The utilisation and decision unit 13 can comprise a number of logic units according to the type of result which is being sought. A first simple logic unit is a buffer store in which will be recorded the successive results of comparisons on the logical entities of a sequence or sequence set, this storing being controlled by the unit 9 through the connection 23 (FIG. 1).

A second important logic unit is a recapitulation register. As shown in FIG. 16, this is a register comprising in this case eight bistable circuits 100.1 to 100.8, associated with an OR logic unit formed by eight circuits 101.1 to 101.8. This recapitulation unit can be associated with a certain number of decision logic units providing a binary result and thus capable of providing control signals. The first is an OR circuit 102 with eight inputs which enables a decision to be made as to whether at least one of the results has been obtained. The second circuit 103 is an AND circuit of the same type which indicates at its output if all the results have been obtained, for example whether all the reference logical entities have been recognised.

The third circuit is composed of a comparator 104 and a register 105. It permits the recapitulation of the results contained in the register 100 to be compared with a certain filed configuration in the register 105.

Finally, the outputs 11 and 106 respectively of the work register 4 and the recapitulation register 100 can be connected directly or by means of an intermediate register to the input of another comparison system which enables the results of the individual comparisons or recapitulations to be compared with a group of types of results contained in a second memory analagous to the memory 1.

It is also possible to apply this system to the identification of logical entities of variable length, for example of the kind serving as delimiters for sequences or sequence sets. The system then preferably comprises three comparison sub-systems such as shown in FIG. 17, the first sub-system 110 being intended for the identification of special characters, the second 111 for the identification of "delimiter" logical entities and the third 112 for the principal comparison.

The data items to be compared coming from the source 7 are received in parallel by the three sub-systems which thus operate simultaneously in synchronism with the output of the said source but according to a different cycle. A buffer store 113 permits the temporary storing of a sequence of logical entities.

The initialisation of each of these sub-systems is then controlled by a processing unit 114, according to the results obtained by the preceding sub-system or sub-systems.

The results of the principal comparison are transmitted to the processing unit 114 by the sub-system 112, by way of the channel 115, accompanied by identification parameters provided particularly by the sub-system 111 and if necessary the stored sequences in the buffer store 113.

FIG. 18 shows the logical organisation of a store which is well adapted to the construction of comparison systems. This store is formed of $h$ identical modules 200.1 to 200.$h$ each comprising $n$ locations of $p$ bits.

The address and data inputs of these modules are respectively connected to the parallel channels 201 and 202. The data outputs of these modules are independent parallel channels 203.*l* to 203.*h*. In certain systems, the store will also comprise multiplexers 204.*l* to 204.*h*, the inputs of which are connected to the output channels of the modules 203.*l* to 203.*h*, the outputs of the multiplexers constituting the parallel connections 205.

The writing control of the memory modules 200.*l* to 200.*h* is effected separately for each module by way of single connections 206.*l* to 206.*h*. These modules are collectively controlled in reading, if this is technologically necessary, through the connection 207. The output multiplexers 204.*l* to 204.*h* are controlled, when they exist, collectively by the parallel connections 208.

When the initialisation of the comparison system is carried out, the reference entities will be successively recorded in the memory modules 200*l* to 200.*h*, at the rate of one entity per module. The data elements of $p$ bits constituting the reference logical entities will be successively presented on the parallel channel 202 and each recorded in the location designated by the address simultaneously presented on the parallel channel 201. The writing operation will be controlled by a signal applied on the connection 206 which terminates at the module of the memory 200 corresponding to the reference entity which is being written.

The $h$ data elements of $p$ bits appearing simultaneously on the parallel outputs 203.*l* to 203.*h* can be directly used for carrying out a comparison operation effected on the data elements of $p$ bits coming from the source 7, characters for example such as described with reference to the above tables and illustrated by FIGS. 1 and 2. These outputs could also be used for the transfer of a part of the contents of one or more modules, in any case in which this is used as the result.

The multiplexers 203.*l* to 203.*h* enable the sequence to be obtained on the parallel channel 205 in the appropriate order of the data units, or bits, constituting the reference logical entities, which sequence is necessary for the bit-by-bit performance of a comparison operation. In this case, the group of parallel address channels 201 and control channels 208 constitutes the channel 14 of FIGS. 1, 7, 9, 11, 12 and 13 which forms the output of the register-counter 15, the channel 208 for controlling the multiplexers 204 constituting the output of the less significant stages of the register 5.

Such a logical organisation of the memory containing the table of reference logical entities will permit, in particular, its rapid change for any source whatever capable of providing these entities successively, character by character or more generally by elements of $p$ bits. This is particularly important in the case of a system such as that shown diagrammatically in FIG. 17, for the "delimiter" reference entities contained in the memory of the sub-system 111 will be provided in general from the source 7 with an output rate similar to that of the data items to be recognised.

The said logical organisation can of course be carried out in ways depending upon the available components. Each memory module 200 can be for example formed of a number of similar integrated circuits, addressed and controlled in parallel. A module formed of two integrated memory circuits of 16 × 4 bits of type TTL 7489 will permit logical entities having a maximum of sixteen characters to be stored. The loading of this module can take place either in octets or in elements of four bits. The reading of the contents of such a module can be effected symmetrically in octets or in elements of four bits, or again it can be effected bit by bit with the aid of a multiplexer having four or eight inputs, or by any combination of two of these forms.

On the other hand, any form utilising a large-capacity component to contain a number of memory modules such as 200.*l* to 200.*h* will involve a more complex execution of the writing and/or reading operations, according to the practical organisation selected. The grouping in a single location of data elements belonging to a number of reference logical entities will require during each cycle of recording the preliminary reading of the elements already recorded and, as a consequence, their temporary storage in a register.

The distribution in a number of locations of different addresses of data elements of the same order belonging to different reference logical entities will impose a successive reading of these elements, which is required for carrying out a single cycle of the comparison operation and, as a consequence, a multiplication by the same factor of the time for carrying out the operation.

Nevertheless, such an organisation can be completely justified because of the economy permitted by the use of a single or a few integrated circuits of large capacity in all cases in which the output rate of the data source permits it.

Figure 19:
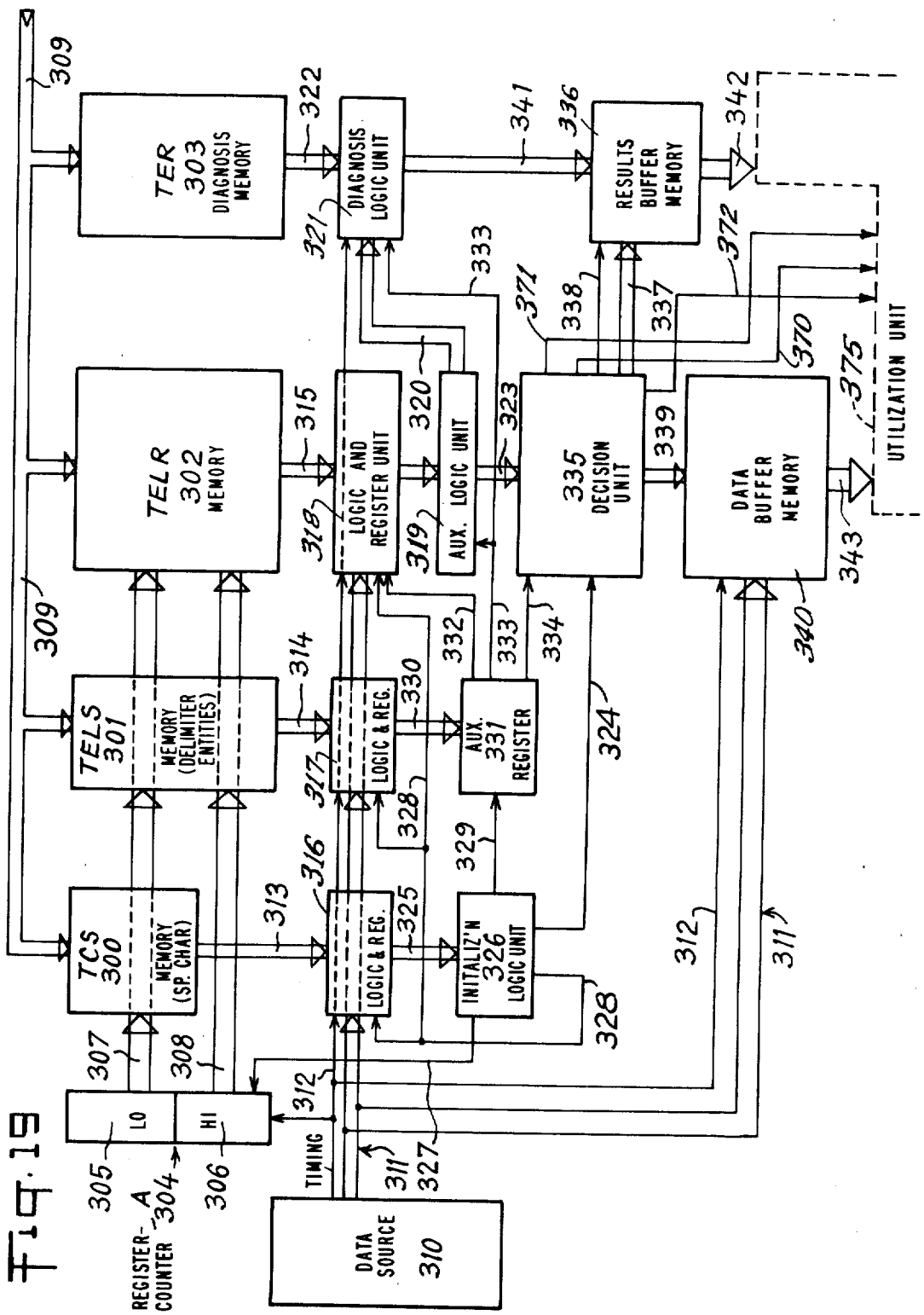
FIG. 19 shows in the form of a functional diagram one embodiment of a system embodying the invention.

The system shown in FIG. 19 comprises three table memories, a memory TCS 300 containing the special characters, a memory TELS 301 containing the special logical entities and a memory TELR 302 containing the reference logical entities, together with a memory TER 303 containing the type of results.

These memories are formed, as shown in FIG. 18, of identical modules 200.*l* to 200.*h* and the same number of multiplexers 204.*l* to 204.*h*.

The memory TER 303 can also be constituted by a certain number of recirculating registers controlled in parallel.

The table memories TCS 300, TELS 301 and TELR 302 are addressed by a common addressing unit A 304 composed of two register-counters 305 and 306 connected in series, the register-counter 306 being of the non-cyclic type, that is to say it returns to its initial condition only under the action of the zero-resetting control 327.

The output 307 of the register-counter 305 corresponds to the low positions of the addressing unit A 304 and is common to the group of three table memories 300-302. The output 308 of the register-counter 306, which corresponds to the maximum number of characters of the special logical entities and reference logical entities, controls only the table memories TELS 301 and TELR 302.

A parallel connection 309 enables these table memories to be filled, for example character by character.

A source 310 provides data in serial form through the connection 311 and a time reference signal through the connection 312.

The comparison between these data items and the outputs 313, 314 and 315 of the table memories TCS 300, TELS 301 and TELR 302 is effected by three logic unit 316, 317 and 318. The two first 316 and 317 correspond to the equal-different function and can be formed for example of a number of circuits such as that shown in FIG. 8, or any logically equivalent circuit using the state-changing controls. The logic unit 318 can have an identical structure or can be constituted of circuits such as those shown in FIGS. 3, 5, 6 and 10 or again may be constituted, as stated above, of multiple function integrated circuits allowing a large variety of comparison funtions.

The output of the a logic unit 318 is collected by an logic unit 319 which effects the combination of the results of the elementary comparisons according to a third logical function such as that described above and represented by way of example at 100 and 101 on FIG. 16.

An output 320 of the logic unit 319 is connected to the logic unit 321, which has for its object to compare the final content of the logic unit 319 with the contents of the table memory TER 303 available on channel 322. The structure of the logic unit 321 is similar to that of the logic unit 318.

The output 325 of the comparison logic unit 316 is connected to an initialisation logic operator unit 326 which, given the signals on the channel 325, develops a signal on connection 324 for controlling the decision unit 335, a signal on connection 327 for resetting to zero the addressing unit A 304, a signal on connection 328 for resetting to zero the work registers of the logic units 316–318, and a signal on connection 329 for transferring the contents of the logic unit 317 through its output connection 330. This transfer is effected in a register 331, the outputs 332, 333 and 334 of which respectively control: the transfer of the result from the logic unit 318 to the logic unit 319; the initialisation of this logic unit 319 and of the logic unit 321; and certain functions of the decision unit 335.

This decision unit 335 receives over the channel 323 the final contents of the logic unit 319 and comprises, as shown in FIG. 16, a certain number of circuits which effect simple logical tests on the result of the comparison contained in the logic unit 319, of the type: total result, partial result, majority result, result in a given order, etc . . . The group of results of these tests can be stored in the buffer memory 336 through the channel 337 and the control connection 338.

The decision unit 335 also provides control signals, initialisation signals and writing signals on channel 339 for the buffer store 340 which receives, through the connections 311 and 312, the data and the time reference provided by the data source 310.

The buffer store 336 is also connected through the channel 341 to the output of the logic unit 321 for effecting comparison with the types of result.

Finally, the output 342 allows the utilisation unit to consult the contents of the buffer store 336, that is to say the results of the tests and of the comparison with the types of results. In the same way, the output 343 of the buffer store 340 enables the use of the sequences of data which have been stored in it.

The above description essentially corresponds to a minimal system working bit by bit.

The same diagram also represents the organisation of a system functioning, for example, octet by octet. In this case, the table memories 300–302 will no longer comprise multiplexers such as those referenced 204.*l* to 204.*h* in FIG. 18 and the logic units 316–318 will comprise at the head a first parallel logic unit such as that shown in FIG. 2.

In addition, the initialisation logic unit 326 and the register 331 may comprise a larger number of outputs corresponding to functions different from those shown in FIG. 19, such as those mentioned above.

This supposes that the table memories 300 and 301 have a corresponding capacity. Certain supplementary outputs of the unit 326 may replace all or part of those shown for the register 331 or, again, may be combined with these latter through an OR logic circuit. This substitution or, more generally, the distribution of the control signals coming from the logic units 326 and 331 can be controlled by the utilisation unit in such a manner as to adapt the initialisation and sequence logic of the system of comparison to the particular structure of a data base and to the needs of a user.

In the same way, supplementary outputs 370, 371, and 372 of the decision unit 335 may provide interruption, request or state signals respectively to a utilisation unit 375, of the computer type shown in dashed lines in FIG. 19 since it is not part of the processing system of FIG. 19, for example, and control signals to the data source unit with a view to its normal sequential operation, or a particular operation such as for example a writing control signal at the electronic coupling unit of a magnetic disc, upon the recognition of the heading characteristic of a particular recording.

In the form described above, in order to be able to carry out a retry in case of error, it will be necessary to construct the buffer store 340 in the form of a random-access memory associated with an address register and this address register will be provided with a duplicate with crossed connections.

Figure 20:
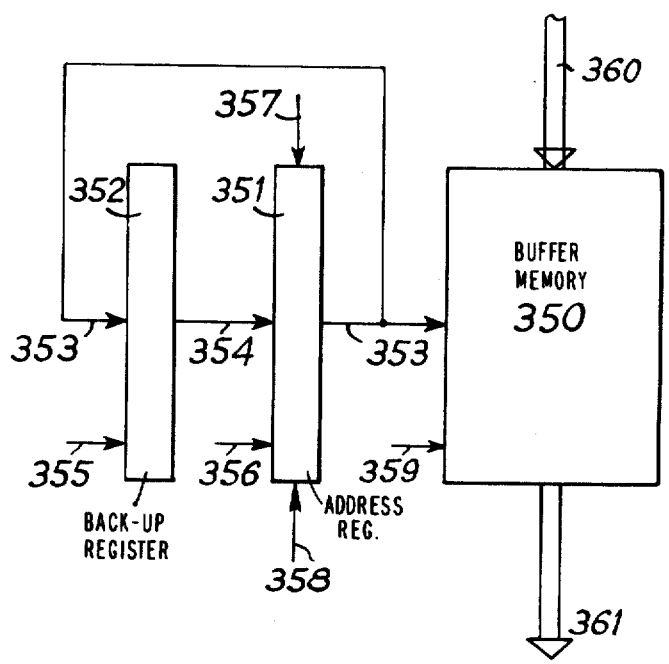
FIG. 20 shows the generic diagram of an embodiment of buffer stores for systems embodying the invention.

As shown in FIG. 20, the buffer store 340 then comprises a read-write memory module 350, an address register 351 and a duplicate register 352. The respective outputs 353 and 354 of these two registers are connected to an input of the other register, thereby permitting reciprocal copying of their contents in a non-destructive manner under the action of the control signals 355 and 356. In addition, the address register 351 has an initialisation control signal 357 and an stepping control signal 358. In normal operation, the advancement control signal 358 permits a sequential recording in the memory module 350 of the data items arriving through channel 360 or their sequential reading through the channel 361, according to the state of the read-write control signal 359.

The result buffer store 336 can also have a similar structure, with the exception of the input channel 360 which is then provided with a multiplexer having two inputs 337 and 341.

Upon reading a data base or upon reception of messages, the control signal 355 allows the storing in the duplicate register 352 of a retry start index pointer at the end of any recording or message read or received correctly, destroying at the same time the preceding retry start index pointer.

The recording or the following message, received from the source over the connection 311, is inscribed in the memory module 350 over the channel 360 then connected to channel 311, with advancement of the addresses by connection 358 then connected to channel 312.

In case of error, the retry start is carried out by actuation of the control signal 356 which causes, in the two buffer stores 336, 340, the copying of the duplicate register 352 in the address register 351.

In the absence of error, the control signal 355 replaces the retry start pointer index at the end of the data which has just been stored in the two buffer stores 336 and 340.

Such a retry can be carried out at any moment and any number of times according to the methods habitually used in the management of memory files and in data transmission.

This arrangement of buffer stores also has the advantage of permitting the suspension of the comparison in the case of overflow of one of the buffer stores with a view to transferring to the utilisation unit the part of their contents corresponding to physical records or messages read or received and completely processed, delimited by the index pointer stored in the buffer register 352, while finally providing for the retrial of the processing with repetition of the physical or message partially processed.

The information stored in the memory modules 350 is then recovered by the utilisation unit through connections 361 (FIG. 20), referred to by the references 342 and 343 in FIG. 19, and the control signal connections 358 (FIG. 20).

This device also permits modifications of the contents of a recording of a data base to be effected in a manner which is simple and automatic. Upon reading of this recording, the position of the record or sub-record to be modified is located by the comparison devices and is retained in the duplicate register 352 under the action of the control signal 355 provided by the decision unit 355, at the time of the identification of a special character or a given special logical entity. The reading is continued to the end of the recording with storing of the whole of this latter in the memory module 350 of the buffer store 340 through connections 311 and 360. The copying of the index pointer contained in the duplicate register 352 into the address register 351 by the control signal 356 then allows the modification to be carried out on the sequence thus indexed. The address register 351 is finally re-initialised by actuation of the control signal 357 and the modified content of the memory module 350 is re-recorded on the data base record medium, for example in the same place if the extent of the modification permits it. This re-writing is effected by a sequential reading of the memory 350 under the action of the control signals 358 and 359, the channel 361 being then connected to the data input of the data base storage unit, for example a magnetic disc.

In the case of a simple modification, for example the bringing up to data of a count or any other numerical parameter, the elements of the modification, operation code and data, can be contained in a special table annexed to the device. The choice of one of these elements is then directly controlled by the output 323 of the logic unit 319 which identifies the indexed record among all those which can be searched by comparison in a simultaneous manner, and of which the descriptors are contained in the table 302.

This device additionally permits a systematic storing of a sequence of logical entities subjected to comparison and which are such that the result of this comparison conditions their effective transfer to the utilisation unit. The index pointer contained in the duplicate register 352 then defines the beginning of such a sequence and its copying through the control signal 356 into the address register 351 under the control of the decision unit 335 permits the re-writing of a later sequence in the same place, with destruction of the unrequired sequence.

This process can be applied to sequence sets with total or partial storage, the decision resulting from a combination of comparison results affecting all or part of these sequences.

Figure 21:
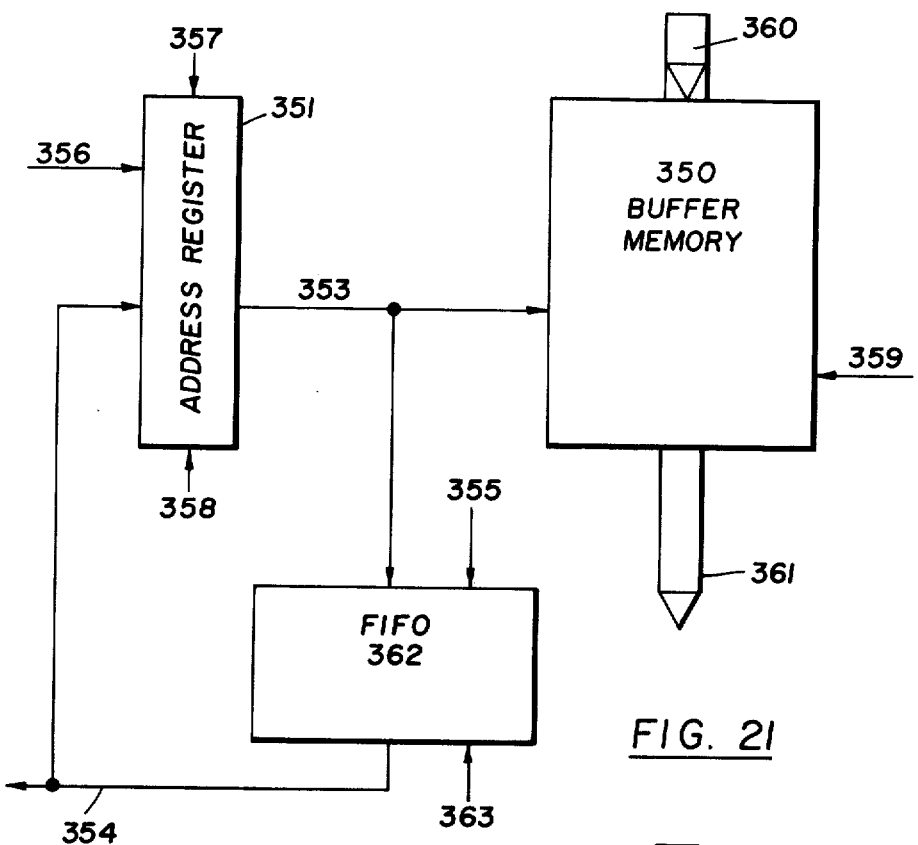
FIG. 21 is a block diagram, a modification of FIG. 20 in which the register 352 is replaced by a FIFO unit.
Figure 22:
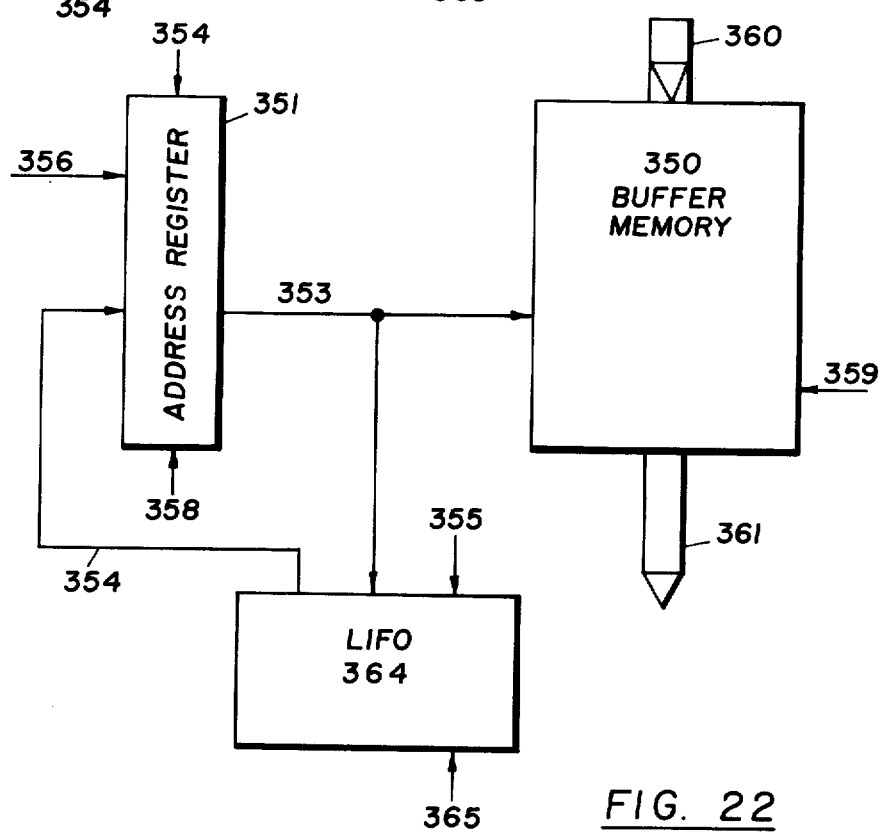
FIG. 22 is a block diagram of another modification of FIG. 20 in which the register 352 is replaced by a LIFO unit.

Such a process requires in general the storing of a number of index pointers for the indexing of as many logical entities or sequences of logical entities, within the same set, before a processing or a decision can take place. For this purpose, the duplicate register 352 is replaced by a "queueing" or "first in first out" (FIFO) structure (362, 363) as shown in FIG. 21, or a "stacking" or "last in first out" (LIFO) structure (364, 363), as shown in FIG. 22 permitting the storing of the said index pointers with retrial and utilisation in an order identical with or the inverse of that of their generation.

In the same way, if it is required to benefit simultaneously from a number of these retrial processes, for modifying and/or for selecting a priori the stored sequences, a number of duplicate registers such as 352 are used, each controlled independently by the circuits for detecting the corresponding events; each can be recopied independently into the address register 351, for carrying out the retry in case of error, the modification, or the decision of non-utilisation relating to the last recording or message.

More generally, the duplicate register 352 can be replaced in the buffer stores 336 and/or 340 by a combination of register 352, queues 362 and stacks 364, permitting any combination of processes such as those described above.

Finally, a duplication of the register of the logic unit 319 permits a retry in case of error or overflow for sequences or sequence sets extending over a number of physical records or a number of messages. Such a treatment of the address unit 304, the work registers of the logic units 317 and 318 and the register 331 will permit retries to be carried out for the data sources in which a logical entity may exist across two physical records or messages, thus rendering totally independent the logical and physical structures of the data source, while permitting an immediate processing of the data read or received.

The invention is not limited to the forms described above and to their modifications. Its generality and the diversity of the possible applications will lead to a multiplicity of possible embodiments.

It should be mentioned that in connection with two dimensional tables or arrays of memory cells such as are incorporated in the memory 1 of FIG. 1, it is common to refer to the table or array as composed of rows and columns of cells, but of course the concepts of rows and of columns are interchangeable with each other.

Furthermore, since in the illustrated cases the columns in which the reference logical entities are respectively stored only need to be addressed at the beginning of a search to load the reference entities into the memory, whereas the rows must be repeatedly scanned as the search proceeds, it is convenient to refer to each row as a "location" in the memory (containing a set of data elements respectively belonging to different stored entities) rather than to use the word "location" to refer to a single memory cell.

We claim:

1. A method for selectively retrieving items of data in accordance with search objectives from an extensive collection of data to be searched available from any data source able to transmit said data to be searched in a substantially continuous sequential flow of data containing logical entities each made up of a sequence of data elements of any one predetermined size beginning with a data element recognizable in said flow as the first element of a logical entity and ending with a data element recognizable in said flow as the last element of a logical entity, comprising for the basic search process the steps of:

selecting in accordance with search objectives, as reference data items, a plurality of reference logical entities made up of a sequence of data elements of said predetermined size;

storing said plurality of reference logical entities in a two dimensional array with one logical entity in each column, each row containing data elements of the same sequential rank of the respective reference logical entities;

electrically receiving sequentially said data elements constituting said flow of data transmitted as aforesaid by a data source from said collection of data to be searched;

detecting the first data element of the first received logical entity;

immediately comparing said first data element simultaneously and independently with the contents of the first row of said array according to a first set of logic functions selected in accordance with search objectives;

immediately combining in parallel the results of that first comparison step with a predetermined set of initial states of a result register according to a second set of logic functions selected in accordance with search objectives and temporarily storing the results of this combination step in said result register;

immediately comparing the next received data element simultaneously and independently with the content of the second row of said array according to said first set of selected logic functions;

immediately combining in parallel the results of that second comparison step with said temporarily stored results of the first combination step according to said second set of selected logic functions and temporarily storing the results of this second combination step in place of said first stored results in said result register;

proceeding with this alternation of comparison and combination steps up to and including either the comparison and combination steps following detection of the last data element of said first received logical element or the comparison step utilizing the last row of said table and the following combination step, whichever occurs first;

providing the results of the last combination step as the result of the foregoing iterative and simultaneous basic search processing of said first received logical entity with reference to said plurality of reference logical entities, and then proceeding according to the same basic search process above set forth following the first-mentioned storage step for processing the further received logical entities beginning in each case with detection of the first data element thereof.

2. A method as defined in claim 1, in which the search to be effected on the said transmitted and received data flow includes a plurality of sub-searches, the respective search objectives of which require reference data items of respectively different formats, in which method the steps of selecting logical entities as reference data items is performed by providing, as reference data items, a plurality of sets of reference logical entities each set being of homogeneous format and all being sequences of data elements of said predetermined size;

in which method, further, the step of storing reference logical entities is performed by storing the said homogeneous sets of reference logical entities respectively in as many arrays of appropriate dimensions according to their respective format and plurality, in which method, further, the step of detecting the first and last element of each received logical entity is independently and concurrently performed in accordance with the said respective different formats, in which method, further, the other steps of said basic search process are simultaneously and individually performed in each sub-search, using for each of said sub-searches the appropriate array, first and second sets of logic functions, and beginning and end detection, and in which method, the step of providing results is performed by independently providing the respective results of the sub-searches.

3. A method as defined in claim 2, in which the logical entities are made up of a variable plurality of characters, each character comprising a predetermined number of data elements, and are ended by a special space or blank character, in which the step of storing the reference logical entities in a two dimensional array is performed by storing them with the said special characters as the last character for all the reference logical entities the length of which is less than or equal to the length of the array, the other reference logical entities being truncated at this length, and in which the method further comprises the steps of:

storing the special character in a second array of one column, proceeding simultaneously and independently by the steps of the basic search process of the method of claim 2 following the providing steps, for each received data element with both of these two arrays, detecting the end of the received logical entity by the positive result of the independent processing using said one column of said second array, and using said detection for recognition of the first and last data elements of a received logical entity and thereby initiating and terminating the basic search process utilizing said two dimensional array.

4. A method as defined in claim 2, in which the received data flow includes special characters of a plurality of different kinds marking respectively different events of the data flow, further comprising the steps of:

providing the iterative independent and simultaneous comparison of each character according to the method of claim 34 with a selected subset of these special characters used as reference logical entities, detecting by the results of this comparison the occurrence of any of the events marked by a special character included in the selected subset, and using this detection at least for determining when a set of sub-searches is complete and whether the result thereof should be stored and combined with a further set of sub-searches.

5. A method as defined in claim 2, in which some of the received logical entities have a special role of reference marks and labels for sequences and series of sequences of logical entities and similar organizations of parts of the data flow, which method further comprises the steps of:

providing the storage of a selected subset of special logical entities in an additional two dimensional array, providing an additional first set of selected logic functions of comparison and an additional second set of selected logic functions of combination for said array, and processing independently and simultaneously, according to the method of claim 34, each received logical entity with reference to said additional array and said additional sets of selected logic functions, and using each of the results so provided for each received logical entity as detecting one event marked by the corresponding special logical entity.

6. A method as defined in claim 1, in which the data flow received from the source contains distinct sequences of consecutive logical entities of which the first and last logical entities of a sequence are recognizable as such, further comprising the steps of:

providing a third set of logic functions, selected in accordance with search objectives, for parallel combination of results in a second level of parallel combination, detecting the start and end of each received sequence of logical entities, at the detection of the end of each received logical entity of said sequence, combining in parallel the results of the last combination step in said basic search process for the logical entity just received with the stored output of the last combination results for any previously received logical entity or entities of the same sequence, according to said third set of selected logic functions, and at the detection of the end of the sequence, providing the outcomes of said second level combination of the results of the last logical entity of the sequence with the results for previous logical entities according to said third set of selected logic functions, as the result of the basic search processing of the received sequence.

7. A method as defined in claim 6, further comprising the steps of:

providing an independent array of reference data and first and second sets of selected logic functions for use in a second basic search process, and at the end of each received sequence of logical entities, submitting the outcomes of said second level combination to a second basic search process carried out in accord with the method set forth in claim 6, using said independent array of reference data and said independent first and second sets of selected logic functions designated for said second basic search process.

8. A method as defined in claim 6, further comprising the steps of:

providing the temporary storage of parts of the received data flow as sequences of logical entities or series of such sequences and of results and outcome of the application of said method of claim 6, using the detection of the beginning and end of the said parts to control the start and stop of said temporary storage, and deciding, at the end of each logical subset of the data flow, the confirmation of the storage or its cancellation according to the results and outcome of the application of said method of claim 6 to the logical entities and sequences of the said data flow.

9. A method as defined in claim 8, in which, in order to provide conditioning of the temporary storage of continuous parts of the data flow upon a nested hierarchy of results of comparison and combination according to said method for different levels of the received data flow, special logical entities, sequences of logical entities or any larger logical subsets, the method further comprises the steps of:

providing a push-down list of pointers to said temporary storage unit for marking up the beginning of said stored continguous parts, at the start of each storage operation, pushing down the pointer marking the beginning of the related part, and at the end of each logical subset of the received data flow on which some decision can be made according to the method, pulling out the relevent pointers and updating, in accord to said decision, the current address of the storage unit.

10. A method as defined in claim 6, in which iterative and simultaneous searches according to the method are used in order to selectively update in accordance with predetermined selection criteria logical records received from a source in the form of a data flow comprising a plurality of successive physical frames of data, further comprising the steps of:

providing the temporary storage of each complete received physical frame of data, simultaneously searching according to the method for all the logical entities and sequences capable of being updated, marking up a pointer the beginning of each such temporarily stored entity or sequence, simultaneously searching for all the logical entities and sequences predetermined by said selection criteria, simultaneously searching according to the method these last logical entities and sequences with the reference data and logic functions predetermined by the selection criteria, using the combined results of this last simultaneous search to decide on the relevance of the updating, and cancelling the irrelevant pointers, and at the end of the physical frame reception either continuing the performance of the method on the next physical frame in case of no pointer left active or, if at least one pointer is left active, executing the updating from the location marked by the pointers left active according to predetermined specifications, sending back the updated data and resuming the performance of the method on the next physical frame.

11. A method as defined in claim 1, applied to a flow of data including sequences of logical entities of various types further comprising the steps of:

providing one or more additional stored arrays of reference logical entities, and additional first and second sets of selected logic functions related respectively thereto, determining the type of each received logical entity according to its position in a sequence of logical entities and results of previous comparisons, and proceeding by the method defined in claim 1 for each received logical entity with a selected one of said additional arrays and related sets of logic functions which are selected in accordance with the entity type determined by the type determination step.

12. A method as defined in claim 1, applied to a flow of data including a plurality of sequences on which different searches are to be made, further comprising the steps of:

providing at least one additional array of reference logical entities and at least one additional set of first and second selected logical functions related thereto, and proceeding by the method defined in claim 1, for each received sequence of said data flow with a subset of arrays and logical functions selected according to the position of said sequence in said data flow and to the results of previous comparison processes.

13. A method as defined in claim 1, in which, in order to provide for a retry of a part of the performance of the basic search process in case of any error determined at the receiving of a data element, the method comprises the further steps of:

subdividing the flow of data into error detection frames containing a predetermined number of data elements, providing the temporary storage of the value of the variables necessary to define the status of the performance of the method at the end of said error detection frames as intermediary results or pointers, at the beginning of each said frame, storing the value of all said variables, and at the end of each frame, using the result of error detection for, in the case of any error detected, restoring all the variables to their value at the beginning of the erroneously received frame and re-performing the method on the frame and, in the case of no error detected, updating the temporary storage to the new values of the variables and resuming the performance of the method for the next error detection frame.

14. A processing system for the iterative and simultaneous comparison of a flow of data, received from a source in serial mode per data element of a predetermined size, with a set of reference logical entities, comprising:

first storage means (1) for storing reference logical entities, having as many locations as there are data elements of said predetermined size in a reference logical entity of a predetermined nominal maximum length, each location comprising a plurality of ordered storage elements, able respectively to contain one data element of different stored logical entities, and having a read-out output (6);

writing means (16) for entering a set of reference logical entities in said first storage means with the data elements of said reference logical entities in sequential order in respective locations of said first storage means, beginning with the first of said locations;

reading means (5) for controlling the read-out output of said first storage means for sequentially causing said first storage means to read out its contents location by location in location sequence in a non-cyclic manner;

first logic means (2) for performing simultaneous and independent comparison of each received data element with the data elements read out of a single storage location by said read-out output of said first storage means;

second logic means (3,4; 25) having temporary output storage means and having an input connected to the output of said first logic means (2) for combining the output of said first logic means with the contents of said output storage means and then substituting the result of the combination into said output means without further combination prior to performance of another comparison in said first logic means (2), and control logic means (19), responsive to timing signals derived from said source during flow of data elements therefrom, for generating the signals necessary to initialize and control said logic means, reading means and storage means.

15. A system as defined in claim 14, in which said second logic means and its output storage means are constituted so that they together form a sequential logic means (25) (FIG. 7).

16. A system as defined in claim 14, in which the output storage means (4) of said second logic means (3) is a distinct unit having an input connected to the output of said second logic means, one output connected to an input of said second logic means and another output for providing an output for said processing system.

17. A system as defined in claim 14, having additional storage means of the same kind as said first storage means so as to provide, together with said first storage means, a plurality of storage means (1a, . . . 1n) for respectively storing different sets of reference logical entities (FIGS. 12 and 13) and in which system said control logic means (19) includes means for selecting one of said plurality of storage means (1a, .. 1n) according to a predetermined plan.

18. A processing system for the iterative and simultaneous comparison of a flow of data, received from a source in a serial mode per data element of a predetermined size, with a set of reference logical entities, comprising:

first storage means (1) for storing reference logical entities, having as many locations as there are data elements of said predetermined size in a reference logical entity of a predetermined nominal maximum length, each location comprising a plurality of ordered storage elements, able respectively to contain one data element of different stored logical entities, and having a read-out output (6);

writing means (16) for entering a set of reference logical entities in said first storage means with the data elements of said reference logical entities in sequential order in respective locations of said first storage means, beginning with the first of said locations;

reading means (5) for controlling the read-out output of said first storage means for sequentially causing said first storage means to read out its contents location by location in location sequence in a non-cyclic manner;

logic means (30) having an output register (4) and having three data inputs respectively connected to said data source, the read-out output of said first storage means and said output register, for performing simultaneous and independent comparison of each received data element with the data elements read out from said first storage means, and combining the results of said comparison with the previous contents of said output storage means and then storing the result of said combination in said output storage means without further combination prior to reception of another data element at its data input connected to said source, and control logic means (19), responsive to timing signals derived from said source during flow of data elements therefrom, for generating the signals necessary to initialize and control said logic means, reading means and storage means.

19. A system as defined in claim 18, having additional storage means of the same kind as said first storage means so as to provide, together with said first storage means, a plurality of storage means (1a, . . . 1n) for respectively storing different sets of reference logical entities (FIGS. 12 and 13) and in which system said control logic means (19) includes means for selecting one of said plurality of storage means (1a, . . . 1n) according to a predetermined plan.

20. A processing system for performing a retrieval search process on variable format structured data containing reference marks indicating structure relations among data items which data is received, together with time reference signals, as a data flow from a source (310) in serial mode per data element of a predetermined size common to all the various formats encountered in the said received data flow comprising first, second and third basic search subsystems arranged for simultaneously receiving said data flow from the same source (310), each of which basis search subsystems is a processing system as defined in claim 18, having respectively the further characteristics that:

in said first subsystem:
said first storage means is a means for storing, as reference logical entities, one sample of each kind of said reference marks contained in said data flow;
said logic means is constituted so as to detect simply the presence or absence of identity between each of the reference marks stored in said first storage means and portions of said data flow, and
said reading means is shared with said second and third subsystems;

in said second subsystem:
said first storage means is a means for storing, as reference logical entities, a set of special logical entities occurring in said data flow characterizing the structure of the data therein and distinguished from said reference marks by being constituted of a sequence of data elements longer than a reference mark;
said logic means is constituted so as to detect simply the presence or absence of identity between each of said special logical entities and portions of said data flow, and
said reading means includes not only a low-end count-beginning portion shared with said first and third subsystems but also a high-end count-continuing portion shared with said third subsystem;

and the processing system further comprises:
an additional register (331) for storing the output of said second subsystem;
initialization logic means (326) responsive to the output of the logic means (316) of said first subsystem and to said time reference signals from said source (310), for resetting to a restarting condition said reading means (304) shared by said subsystems and the logic means of each of said subsystems and for transfer of the output of said second subsystem to said additional register (331);
and additional logic means (319) responsive to the output of the logic means (318) of said third subsystem under control of said additional register for providing an output according to an additional set of selected logic functions;
a decision unit (335) having an input for receiving the output of said additional logic means (319) and control inputs connected to outputs of said initialization logic means (326) and of said additional register (331) and having an output (339) for controlling storage of portions of said data flow and related time reference signals, and
buffer storage means (340), controlled by said output of said decision unit (335), for storing a portion of said data flow including time reference signals concurrently received therewith from said source (310).

21. A processing system as defined in claim 20, which includes also a fourth search subsystem comprising:
memory means (303) for storing in a two dimensional array sets of typical results deliverable by said additional logic means (319) in a plurality of particular circumstances;
diagnosis logic means (321) for comparing the results obtained by said additional logic means (319) with all of the typical results stored in said memory means (303) under control of said reference timing signals and under initialization control of said additional register (331), and
second buffer storage means (342) for storing the output of said diagnosis logic means and for storing also the output of said additional logic unit (319) under control of said decision unit (335).

22. A processing system as defined in claim 20, in which said decision unit also has outputs for providing interruption, request or state signals to a unit external to the system provided for utilizing data stored in said buffer storage means (340).

23. A processing system as defined in claim 20, in which each of said subsystems is organized in a modular manner (FIG. 18).

24. A system as defined in claim 18, in which said logic means (30) and said output register (4) are constituted so that they form together a sequential logic means (35, FIG. 11).

25. A system as defined in claim 18, further comprising additional logic means (101, FIG. 16) having an output register (100) for combining the successive results at the output of the register (4) and other logic means (102, 103, 104, 105) for testing the output of said register (100) and generating decision control signals.

26. A system as defined in claim 18, in which there are also provided data buffer storage means (FIG. 20) for temporarily storing parts of the received data flow, comprising:
buffer memory means (350),
address register means (351), and
back-up register means (352),
said buffer and address register means (351, 352) being loop-connected (353, 354) to the address input of said buffer memory means (350) and respectively having write control inputs (356, 355) for copying each register into the other one, and said address register means (351) also having an initializing control input (357) and a stepping control input (358).

27. A system as defined in claim 26 in which said back-up register means are constituted as a FIFO queuing register (362, FIG. 21) comprising a writing control input (355) and a reading control input (363).

28. A system as defined in claim 26 in which said back-up register means are constituted as a LIFO stack register (364, FIG. 22) comprising a push-down control input (355) and a pull-up control input (365).

29. A system as defined in claim 26 in which there are also provided back-up registers respectively for the output register (4) and the reading means (5) for temporarily storing the state of said output register and the state of said reading means in case of a retry operation.

30. A system as defined in claim 26, in which said data buffer storage means is provided with additional storage means for storing the elements defining modifications to be made to a record contained in said buffer memory means (350) and is also provided with decision means (335) responsive to the output of said output register (4) for effecting, at the location in said data buffer storage means specified by the contents of one of said duplicate registers, the modifications defined by said elements.

* * * * *

UNITED STATES PATENT OFFICE
CERTIFICATE OF CORRECTION

PATENT NO. : 4,053,871
DATED : October 11, 1977
INVENTOR(S) : Jacques M. VIDALIN ET AL.

It is certified that error appears in the above-identified patent and that said Letters Patent are hereby corrected as shown below:

Column 29, line 43, claim 1 of the patent:

change "logical element" to -- logical entity --.

Column 38, line 2, claim 30 of the patent:

change "(335)" to -- (359) --.

Signed and Sealed this

Eighteenth Day of April 1978

[SEAL]

Attest:

RUTH C. MASON
Attesting Officer

LUTRELLE F. PARKER
Acting Commissioner of Patents and Trademarks